Sept. 12, 1961 W. R. BROWNLEE 2,999,638
MEASURING AND CONTROLLING APPARATUS
Filed Jan. 7, 1957 3 Sheets-Sheet 1

INVENTOR.
WILLIAM R. BROWNLEE
BY Arthur H. Swanson
ATTORNEY.

Sept. 12, 1961  W. R. BROWNLEE  2,999,638
MEASURING AND CONTROLLING APPARATUS
Filed Jan. 7, 1957  3 Sheets-Sheet 2

*INVENTOR.*
WILLIAM R. BROWNLEE
BY
*Arthur H. Swanson*
ATTORNEY.

INVENTOR.
WILLIAM R. BROWNLEE
BY Arthur H. Swanson
ATTORNEY.

United States Patent Office 2,999,638
Patented Sept. 12, 1961

2,999,638
MEASURING AND CONTROLLING APPARATUS
William R. Brownlee, 780 Montgomery Drive,
Birmingham 9, Ala.
Filed Jan. 7, 1957, Ser. No. 632,756
10 Claims. (Cl. 235—185)

The present invention relates generally to the assignment of the loads to the interconnected generating plants of an electric power generating and distributing system in such a manner as to maintain at a minimum the cost of the total delivered energy in the system, and hence to provide the most economical operation of the system. Specifically, the invention relates to methods and apparatus for automatically effecting such assignment of the plant loads in accordance with the incremental costs of delivered energy for the plants so as to coordinate the incremental generating costs and incremental transmission losses in the system to the end of securing the most economical combination of plant loadings.

More specifically, the present invention pertains to methods and apparatus of the stated type for providing a measure of the optimum loading of each of the system plants, for any given total system load, by the use of an analog of the system, these measures being utilized for the preparation of optimum generating schedules, or for controlling the plants automatically so as to provide the most economical operation of the system.

A general object of the present invention is to provide an improved apparatus for use in assigning the loads to the interconnected generating plants of an electric power generating and distributing system in accordance with the incremental costs of delivered energy for the plants so as to coordinate the incremental transmission losses and incremental generating costs in the system to the end of securing the most economical loading of the system plants and the most economical operation of the system.

A specific object of the invention is to provide a novel apparatus of the foregoing type for determining the optimum loading for each of the system plants, for any given total system load, by the use of an analog of the system. A more specific object of the invention is to provide a novel apparatus as just specified whereby the phase angles between the output voltages of the simulated plants and the voltage of a simulated reference point in the system analog are utilized in determining or computing the plant loadings which result in economic balance between the plants and in equality between the incremental costs of delivered energy for the plants, and which are thus the optimum plant loadings for the corresponding value of total system load.

A still more specific object of the invention is to provide novel apparatus of the foregoing type which determines, in accordance with the values of said phase angles, the amount and direction, if any, by which the output of each simulated plant of the system analog must be changed in order to establish and maintain optimum plant loading values which, when assumed by the actual plants, will result in operation of the plants with equal incremental costs of delivered energy, and hence in operation of the plants in economic balance.

More specifically, it is an object of the invention to provide novel apparatus of the type just described which produces, for each simulated system plant, a deviation effect representative of any departure from equality between the incremental cost of delivered energy for that plant and the incremental cost of delivered energy common to the others of the plants at that time, and hence representative of any deviation of the plant from economic balance with respect to the other plants, said deviation effect being a measure of the amount and direction by which the plant output must be changed in order to establish the optimum value thereof for the existing conditions.

Still more specifically, it is an object of the invention to provide novel apparatus as just specified which produces, for each simulated system plant, an effect which is a measure of the incremental transmission loss for the plant with respect to a chosen common reference point in the simulated system of the system analog, and which effects a comparison for each plant between said loss effect and an effect which is a measure of the incremental generating cost for the plant with respect to said reference point, said loss and cost effects being equal when the plant is in economic balance.

An even more specific object of the invention is to provide novel apparatus of the type just described which detects, by means of said comparisons, any deviation between the loss and cost effects for each simulated plant, and which utilizes this detected deviation to produce said deviation effect which is representative of any deviation or departure of the plant from economic balance.

A still more specific object of the invention is to provide novel apparatus as just specified wherein each of said incremental transmission loss effects is produced or computed in the form of an incremental transmission loss ratio for the corresponding simulated plant with respect to said common reference point, wherein each of said ratios is a function of solely (1) the phase angle between the bus voltage of the corresponding simulated plant and a common reference voltage individual to said reference point, and (2) the constant ratio of the reactance to the resistance of the equivalent path or transfer impedance between the corresponding simulated plant and said reference point, and wherein each of said incremental generating cost effects is produced or computed in the form of an incremental generating cost ratio for the corresponding simulated plant with respect to said reference point, for comparison with the corresponding incremental transmission loss ratio.

Another specific object of the invention is to provide novel apparatus of the foregoing type which produces an effect, for each of selected ones of the system plants, which is representative of the optimum loading or output for that plant for a given system load on the simulated system of the analog, the combination of these loadings representing an optimum plant loading schedule which, if followed, will provide the most economic operation of the system for said given system load.

Still another specific object of the invention is to provide novel apparatus as just specified wherein the value of the load on the simulated system is adjusted or established in accordance with a desired, contemplated, or existing value of load on the actual system represented by the simulated system. A still more specific object of the invention is to provide novel apparatus of this type in which the value of the simulated system load is adjusted or established automatically in accordance with the existing load, the area requirement, or other condition of the actual system.

Still another specific object of the invention is to provide novel apparatus of the foregoing type which automatically controls the output of each of the selected ones of the actual system plants in accordance with said produced effect which is representative of the optimum loading or output for that plant under the existing conditions, such control being effective to maintain equality between the incremental transmission losses and incremental generating costs for each of said actual plants, and hence to maintain each of said actual plants in economic balance with respect to the reference point in the actual system, and with respect to each of the others of said actual plants.

Finally, it is a specific object of the present invention to provide a novel apparatus of the specified type for providing, by means of phase angles derived from an analog of an actual system, an optimum or most economical schedule of optimum plant loadings for any given system load conditions, which schedule, when applied to the outputs of the actual plants, serves to maintain an optimum distribution of the given value of system load among the plants of the actual system, and to maintain the plants in operation with equal incremental costs of delivered energy, and the system in operation in the most economical manner.

It has been recognized in the past that the maintenance of an optimum generating or loading schedule in a power system, for maintaining economical system operation and a minimum cost of total delivered energy in the system, requires the continual coordination of the system generating costs and transmission losses. To this end, various methods have been developed in the past for obtaining system transmission loss constants, usually referred to as B-type constants, and arrangements have been described for applying these constants to system load scheduling or dispatching problems. These applications have usually involved the comparison of incremental fuel costs and incremental transmission losses in arriving at the optimum generating schedules to be followed, the incremental transmission losses being calculated on the basis of the previously determined B-type constants mentioned above.

As is well known to those skilled in the art, the foregoing previously known and used methods of calculating and coordinating incremental costs and losses for arriving at optimum generating schedules are subject to numerous significant disadvantages. These disadvantages are due, primarily, to the frequently unsatisfactory nature of the B-type constants, to the practical difficulties encountered in obtaining such constants, and to the complexity of the computations involved in applying the constants to the problem and in solving the resulting simultaneous equations.

I have discovered, however, a novel method for determining incremental transmission losses which is not subject to the above-noted disadvantages associated with the B-type loss constants and their use in obtaining optimum generating schedules. Specifically, I have discovered that a unique relationship exists between the incremental transmission loss between two points and the phase angle between the voltages at these points. More specifically I have discovered that the incremental transmission loss $$\left(\frac{dL}{dP}\right)$$

between two plants can be expressed as a function of solely the phase angle ($\theta$) between the bus voltages of the two plants and the constant ratio of reactance to resistance (K) of the equivalent path joining the two plants.

This unique relationship has been described, developed, and explained in my paper entitled "Co-ordination of Incremental Fuel Costs and Incremental Transmission Losses by Functions of Voltage Phase Angles" which appeared at pages 529 to 533 of part IIIA, Power Apparatus and Systems, of volume 73 of the AIEE Transactions. In that paper, I have shown that the following incremental transmission loss equation properly defines the incremental transmission loss between two plants in terms of solely the factors noted and defined above:

$$\frac{dL}{dP} = \frac{2 \sin \theta}{K \cos \theta + \sin \theta}$$

I have also shown in the above-mentioned paper that this unique expression for incremental transmission loss can be utilized to advantage in a practical comparison method which I have developed for determining, in an accurate but relatively simple manner, when the plants of a system, and hence the entire system, are in economic balance, and hence when the system is operating at a minimum cost of total delivered energy. Specifically, I have shown in said paper that the Plants 1 and 2 of any given pair of plants of a system will have the same incremental cost of delivered energy at any given point, and hence will be in economic balance, when the following economic balance equation, relating the incremental generating costs and incremental transmission losses for the two plants, is satisfied:

$$\frac{dF_2/dP_2}{dF_1/dP_1} = \frac{K \cos \theta + \sin \theta}{K \cos \theta - \sin \theta}$$

wherein: $dF_1/dP_1$ and $dF_2/dP_2$ are the incremental generating costs for Plants 1 and 2, respectively, K is the above reactance-resistance ratio of the transfer impedance or equivalent path between the two plants, and $\theta$ is the phase angle by which the bus voltage at Plant 1 leads the bus voltage at Plant 2.

As pointed out in said paper, the foregoing balance equation for a pair of plants compares the incremental transmission loss ratio between the plants, as determined by my foregoing incremental transmission loss equation, with the incremental generating cost ratio for the plants. Thus, when this balance equation is satisfied, the corresponding plants operate at the same incremental cost of delivered energy at any given point, and are in economic balance. Further, when all pairs of the system plants are in such economic balance, the entire system is in economic balance.

The foregoing phase angle loss computing and comparison method for determining when the pairs of plants of a system are in economic balance, and when the entire system is in balance, is, and is described in said paper as being, a method which was developed for use in simplifying the adequate planning of power system expansion. I have discovered, however, that this method also constitutes a highly effective, advantageous, and practical tool of relative simplicity for use in assigning the loads to the plants of an actual, operating system so as to provide optimum generating or loading schedules and economical system operation under the actual system loading and operating conditions, inasmuch as the practice of this method requires a knowledge of only three readily obtainable factors: namely, plant incremental generating costs, constant reactance to resistance ratios, and plant bus voltage phase angles. Moreover, the use of this method in the above manner does not involve the disadvantages encountered with the use of the previously known methods employing the B-type loss constants, since the present method is not subject to the deficiencies inherent in the prior methods. These factors, together with the basic concepts involved in my comparison method, make this method a highly desirable and practical one for use in apparatus invented by me for automatically determining when the plants of an operating system are in economic balance, for computing what changes, if any, in the plant loadings are needed to provide the most economical combination of plant loadings, and for automatically controlling the loading of the plants in accordance with the computed optimum loading data.

Accordingly, in my copending application Serial No. 632,917 now U.S. Patent No. 2,861,197 filed on even date herewith, I have disclosed and claimed novel apparatus invented by me which is operative in accordance with the foregoing incremental transmission loss and balance equations and comparison method to produce effects representative of the incremental transmission loss ratio for a pair of inter-connected generating plants, to detect deviation from economic balance between pairs of such plants, and to assign the loads to such plants in relation to the incremental costs of delivered energy for the plants.

As explained in the aforementioned application, the nature of the load assigning method and apparatus disclosed therein makes it desirable, when selecting the pairs of plants between which the incremental costs and losses are to be compared, to choose, for the plants of each pair, plants which are adjacent electrically, so as to minimize the influence of intervening plants on the computed incremental losses. I have discovered, however, a unique expression which accurately relates the incremental transmission loss between two plants to the phase angle between the bus voltages of the plants notwithstanding the presence of intermediate generation along the path interconnecting the two plants.

Specifically, this new expression for the incremental transmission loss between two plants takes into account the effect or influence exerted on the incremental loss by a typical intermediate generating plant. In other words, this expression is based on the assumption that there is an intermediate plant on the line connecting the two plants between which it is desired to determine the incremental transmission loss, and the expression is therefore arranged to provide a measure of the true incremental transmission loss between said two plants, taking into account the influence of an intermediate plant.

This novel two-step or two-section expression or equation for the incremental transmission loss between two plants is derived and developed from my foregoing simple or single-step loss equation by applying the latter in two successive steps in the manner shown in appendix I of my aforementioned paper, wherein the derivation of this two-step equation is set forth. As shown in said paper, this equation is:

$$\frac{dL}{dP} = \frac{4K \tan \frac{1}{2}\theta}{(K + \tan \frac{1}{2}\theta)^2}$$

wherein $$\frac{dL}{dP}$$

is the incremental transmission loss between the two plants in question which is to be determined by means of the equation, and wherein $\theta$ and $K$ are the respective phase angle between the plant bus voltages and the constant ratio of reactance to resistance or equivalent path between the plants, all as for the single-step loss equation as set forth hereinbefore. It is apparent that this two-step loss equation, like its single-step forerunner, provides a measure of the incremental transmission loss in terms of or as a function of solely the phase angle $\theta$ and the constant $K$.

I have found that the procedure on which this two-step equation is based, of treating each pair of plants as if there were one intermediate plant on a direct line between them, renders the equation adequately accurate for use in calculating the incremental transmission loss between practically any two plants of the system, since it provides accurate results for both closely and widely spaced plants, either with or without intermediate or intervening generation on the line between them. In the case of plants which are near to each other, the phase angles are relatively small, so that there is practically no difference in the loss values obtained by the single-step and two-step equations. The larger phase angles are most likely to occur for plants with greater separation and hence with intervening plants, and for these the two-step equation is closely applicable.

The foregoing two-step loss equation, like the foregoing original one-step loss and comparison equations and method, is, and is described in the aforementioned paper as being, an expression which was developed for use in simplifying the adequate planning of power system expansion. I have discovered, however, that this two-step loss expression or equation constitutes a practically useful and desirable tool for use in automatically determining deviation from economic balance between the plants of an actual operating system, and in assigning the plant loads in such an actual system so as to provide the most economical combination of plant loadings. An important feature of the two-step loss equation in this connection is that its use makes it unnecessary for the plants between which economic balance comparisons are effected to be electrically close together.

In connection with the last mentioned discovery, I have invented improved economic load assigning apparatus which operates according to the foregoing two-step loss method and equation, and hence embodies the foregoing feature. Thus, this improved apparatus can be and desirably is arranged to compare the incremental generating costs and transmission losses between one plant, chosen as the reference plant, and each other plant of the system. In other words, the use of the foregoing two-step loss equation in this apparatus permits each generating plant in the system to be compared directly with a single chosen reference plant, since the greater distances between compared plants resulting from this comparison method do not produce consequential inaccuracies when the two-step loss equation is employed.

This improved economic load assigning apparatus, constructed and arranged to operate in accordance with the foregoing two-step loss equation and hence in accordance with the desirable direct plants-to-reference plant economic balance comparison method just described, operates with improved accuracy and flexibility, and with a smaller amount of equipment, in comparison to the apparatus of my aforementioned copending application. Therefore, it is apparent that this improved apparatus represents a practical and significant advance over the apparatus of said copending application. This improved apparatus is disclosed and claimed in a second copending application of mine Serial No. 632,839 filed on even date herewith.

I have also discovered, moreover, and have disclosed and claimed in the last mentioned application, an improved, novel comparison method for determining when the two plants of a pair are in economic balance and hence have equal incremental cost and loss ratios and equal incremental costs of delivered energy, for detecting deviation from economic balance between such plants, and for use in assigning the loads to the plants in accordance with their incremental costs of delivered energy. This improved comparison method is characterized by the use of an incremental transmission loss ratio which is a predetermined linear function of the corresponding phase angle $\theta$.

Specifically, in accordance with this improved comparison method, an incremental transmission loss ratio for two plants, which is a predetermined linear function of the phase angle $\theta$ for the two plants, is compared to an incremental generating cost ratio for the two plants which is equal to the incremental transmission loss ratio when the two plants are in economic balance. Any deviation or difference between these ratios represents a corresponding deviation from economic balance between the two plants, and a corresponding deviation from equal incremental costs of delivered energy for the two plants.

In connection with the foregoing novel comparison method, I have developed, and have disclosed in the last mentioned application, a novel economic balance or comparison expression or equation which is based on the foregoing two-step loss equation and in which the incremental transmission loss ratio term is a linear function of $\theta$, while the incremental generating cost ratio term is selected and arranged to be equal to the loss ratio term when the two plants involved have equal incremental delivered energy costs at any given point and are in economic balance. This novel linear two-step balance equation is:

$$\frac{dF_2/dP_2 - dF_1/dP_1}{dF_2/dP_2 + dF_1/dP_1} = \frac{2K \tan \frac{1}{2}\theta}{K^2 + \tan^2 \frac{1}{2}\theta} \quad (1)$$

wherein:

$dF_1/dP_1$ and $dF_2/dP_2$ are the incremental generating costs for two plants, 1 and 2, respectively, and K and $\theta$ are the foregoing respective constant ratio and bus voltage phase angle for the two plants.

Equation 1 is obtained by rearranging the basic economic balance Equation 11 of my aforementioned paper, $$\frac{dF_2/dP_2}{dF_1/dP_1} = \frac{1}{1 - dL/dP_{1-2}}$$

as:

$$\frac{dF_2/dP_2 - dF_1/dP_1}{dF_2/dP_2 + dF_1/dP_1} = \frac{dL/dP_{1-2}}{2 - dL/dP_{1-2}}$$

and by combining this new basic balance equation with the foregoing two-step incremental transmission loss equation of column 5:

$$\frac{dL}{dP} = \frac{4K \tan \frac{1}{2}\theta}{(K + \tan \frac{1}{2}\theta)^2}$$

By assigning a series of values to $\theta$ in the right-hand or loss ratio term of the foregoing improved balance Equation 1, and by then plotting a series of curves of the value of the loss ratio term versus $\theta$, each curve being for a different arbitrarily assigned value of K, it is seen that this loss ratio term is a linear function of $\theta$, as is desired. Specifically, it is shown by such plotted curves that this loss ratio term can be expressed as follows:

$$\frac{2K \tan \frac{1}{2}\theta}{K^2 + \tan^2 \frac{1}{2}\theta} = \frac{0.0184K}{K^2 + 0.17}\theta \quad (2)$$

Since the right-hand term of Equation 2 is clearly a linear expression or function of $\theta$ for any given value of the constant K, it is apparent that the incremental transmission loss ratio term of the above balance Equation 1 is a linear function of $\theta$.

Accordingly, the above two-step linear balance Equation 1 can be written:

$$\frac{dF_2/dP_2 - dF_1/dP_1}{dF_2/dP_2 + dF_1/dP_1} = \frac{0.0184K}{K^2 + 0.17}\theta \quad (3)$$

Thus, when the value of the left-hand, incremental generating cost ratio term of Equation 3 is equal to the incremental transmission loss ratio value expressed by the right-hand term as a linear function of $\theta$, Equation 3 is satisfied, and the two plants involved have the same incremental cost of delivered energy at any given point, and hence are in economic balance.

In addition to discovering the foregoing novel linear comparison method, I have invented novel apparatus for carrying out this method in accordance with the foregoing linear balance or comparison Equations 1 and 3. As will be apparent, this new apparatus represents a practical and significant improvement over the apparatus of my first mentioned copending application, since the improved apparatus provides improved accuracy and flexibility of operation while being appreciably less complex than that of said first mentioned copending application. This improved apparatus is disclosed and claimed in the second of my above-noted copending applications.

In addition to the foregoing, I have discovered an improved and novel economic balance determining and plant load assigning method which is disclosed and claimed in a third copending application of mine Serial No. 632,807 now U.S. Patent No. 2,861,196 filed on even date herewith. This method, which is based on the foregoing linear two-step balance Equations 1 and 3, represents a significant and practical improvement over my previous methods, and is based on a discovery which I have made that the economic balance and relative incremental delivered energy cost determinations for the plants of a system can be effected by comparing each plant with a predetermined reference point on the system which is common to all of the plants and which is not necessarily a generating plant.

More specifically, this method embodies a discovery of mine that the foregoing economic balance Equation 3 can be rewritten as a new economic balance or reference point comparison equation for comparing any generating plant with a fixed and arbitary value of generating cost at the aforementioned chosen common point on the system. This new equation is:

$$\frac{dF_n/dP_n - F_0}{dF_n/dP_n + F_0} = \frac{0.0184K}{K^2 + 0.17}\theta_{n-0} \quad (4)$$

wherein:

$dF_n/dP_n$ is the incremental generating cost for plant $n$, $F_0$ is the arbitrary reference generating cost for the common reference point O, $\theta_{n-0}$ is the phase angle in degrees by which the bus voltage at plant $n$ leads the reference voltage at point O, and K is the constant ratio of the reactance to the resistance of the equivalent path or transfer impedance between plant $n$ and point O.

It will be remembered that Equation 3 is employed to determine when the plants of a pair are in economic balance, since this equation is satisfied only when the incremental delivered energy costs of the compared plants are equal, and hence when the plants are in economic balance. Similarly, the new balance Equation 4 is employed in accordance with the method of said third application of mine to determine when the corresponding plant is in economic balance with respect to said common point, since this new equation is satisfied only when the incremental delivered energy cost for the corresponding plant is equal to the incremental delivered energy cost common to the other plants at the time, and hence when the corresponding plant is in economic balance with the other plants.

In connection with the foregoing improved method, I have invented improved and novel economic balance determining and plant load assigning apparatus which is disclosed and claimed in said third application of mine and which operates in accordance with the reference point comparison method and equation just described. This apparatus also embodies another discovery and novel concept of mine whereby the plant loads or outputs are assigned in an economic manner at the respective plants on the basis of relative incremental delivered energy cost and economic balance computations and comparisons effected at the plants themselves. One of the many advantages of this improved method and apparatus is the material reduction in the number of telemetering channels required as compared with the number needed when the arrangements of my aforementioned first and second applications are employed. However, this method and apparatus utilize a common reference phase angle signal which is transmitted from a dispatching location to the computing arrangement in each plant to be controlled.

Finally, I have discovered an improved and novel method and apparatus for use therewith which I am disclosing and claiming herein as the method and apparatus according to the present invention. This method and apparatus are characterized by the objects recited hereinbefore, and by the use of my reference point comparison method and Equation 4. Unlike the arrangement of my aforementioned third application, however, the present invention does not require that the computing circuitry for each plant be located at the plant itself. Instead, according to the present invention, the economic balance determining and reference point comparison equation solving arrangements for all of the system plants to be controlled are advantageously grounded together at a common, convenient location.

Also, instead of requiring the telemetering of phase angle signals between a point and the plants, the present invention features the use, at the common location, of an analog of the actual system as the source of the phase angle signals needed by the computing arrangements for the solution of the comparison or economic balance equation for each plant. Therefore, the method and apparatus according to the present invention represent a significant and practical improvement over the methods and arrangements of my aforementioned copending applications. Of the many practical advantages provided by the present invention, one of especial importance is the absence of the need for transmitting or telemetering any phase angle signals or data.

In accordance with the foregoing, it is an object of the present invention to provide a novel method and apparatus, as just described, for use in assigning the loads to the plants of an actual system in accordance with optimum values for these loads as computed by my improved reference point phase angle method applied to an analog of the actual system, the phase angle values needed for the solution of the economic balance comparison equation for each plant being obtained from the simulated system provided by the system analog.

The foregoing and other desirable objects of the present invention are fulfilled by providing, at a convenient common location, computing and comparing means having a portion individual to each system plant whose loading is to be assigned in accordance with the invention. An analog device at the common location, arranged to represent or simulate the actual system, supplies to each of the computing and comparing portions the phase angle and load data necessary to enable the portion to adjust the output of the corresponding simulated plant to the value necessary to satisfy economic balance Equation 4 for this simulated plant, and to cause the latter to be in economic balance with the common reference point in the simulated system, and with the remainder of the simulated plants. With the outputs of all of the simulated plants so adjusted that all of the latter are in economic balance for the particular load then present on the simulated system, these outputs are representative of those which the respective plants of the actual system must assume in order that they operate in economic balance with respect to one another, and with equal incremental costs of delivered energy, for the particular actual load conditions corresponding to those for which the simulated system is then adjusted.

The values of the simulated plant outputs, determined by the computing portions in the foregoing manner, are representative of the optimum loading for each actual plant which will provide the most economical combination of plant loads and the most economical system operation under the actual system load conditions simulated by the analog. These values may be displayed to permit the preparation of optimum generating schedules and/or to provide a basis for the manual control of the outputs of the actual plants. Also, these values may be employed to control the outputs of the actual plants automatically so that these outputs will be automatically maintained at the optimum values, corresponding to those determined for and by the use of the simulated plants.

According to one aspect of the invention, the value of load on the simulated system of the analog is adjusted or set manually to correspond to a desired or predetermined value of load on the actual system, and the resulting values of output for the simulated plants produced by the apparatus are employed as measures of the manner in which the actual plants should be loaded in order to achieve the most economical system operation for the chosen value of system load. Alternatively, the value of load on the simulated system may be set automatically to correspond to the existing load on the actual system, or as dictated by an area requirement signal indicative of a need for a change in system generation in order to maintain a desired interchange schedule.

In all cases, the resulting values of output for the simulated plants, which are produced by the apparatus in its operation of establishing economic balance between the simulated plants, are representative of the most economical combination of loadings for the actual system plants under the corresponding actual system load conditions. The assignment of these optimum values of plant output or load or generation to the actual plants results in the operation of these plants in economic balance and with equal incremental delivered energy costs, and in operation of the system at a minimum cost of total delivered energy, and hence in the most economical manner.

A better understanding of the present invention may be had from the following detailed description of apparatus embodying the invention, which description is to be read in connection with the accompanying drawings, wherein:

FIG. 2 is a diagrammatic representation of the configuration of the typical power system to which the FIG. 1 apparatus is assumed to be applied;

FIGS. 4 and 5 are schematic circuit diagrams of arrangements according to the invention which may be employed to adjust the load on the system analog of the apparatus of FIGS. 1 and 3.

THE ARRANGEMENT OF FIGS. 1 AND 2

Figure 1:
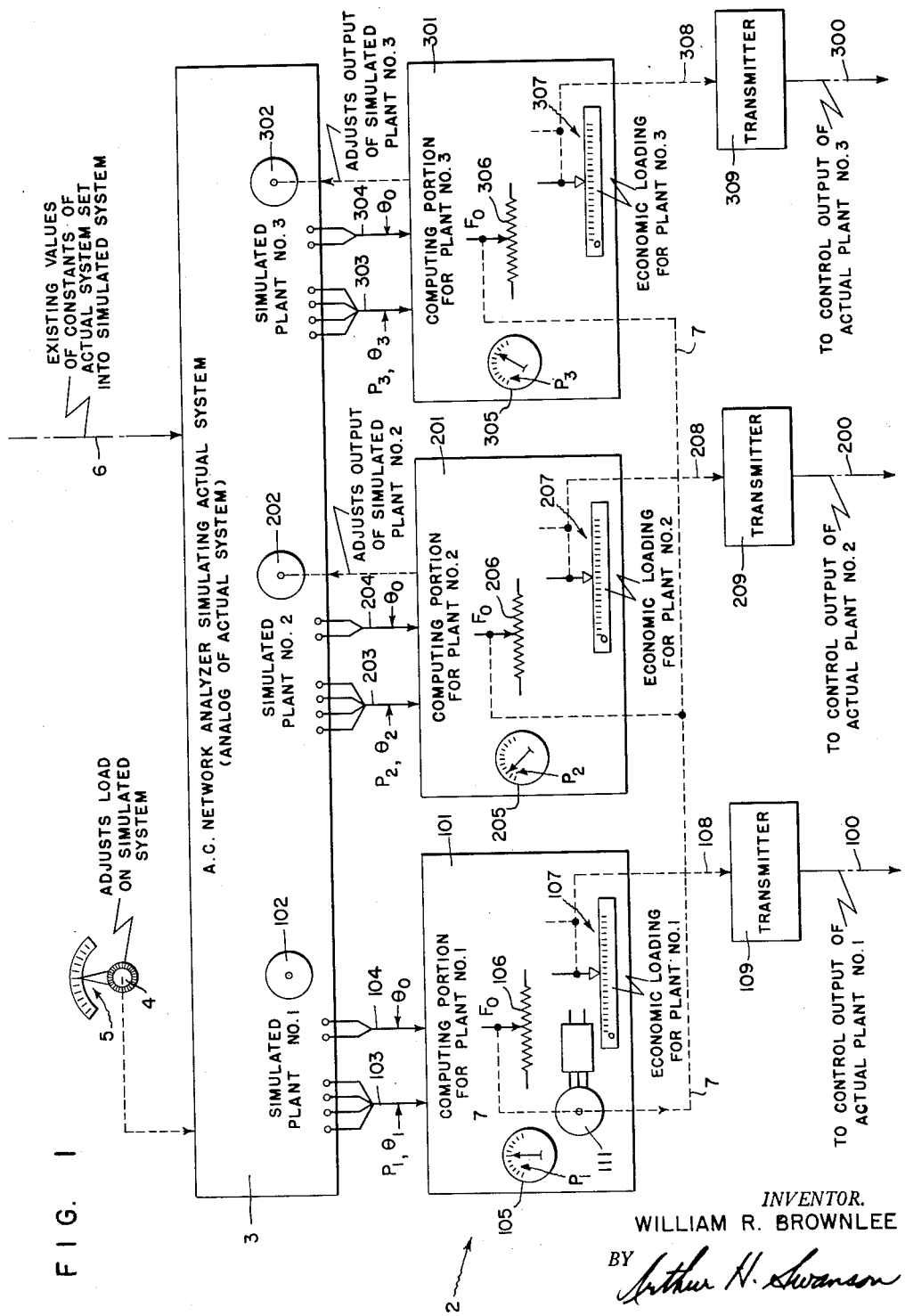
FIG. 1 is a block diagram showing economic load assigning apparatus embodying the present invention and applied to a typical electric power generation and distribution system.

The block diagram of FIG. 1 illustrates broadly a form which may desirably be taken by the novel economic load assigning apparatus of the present invention. This illustrated apparatus embodiment of the invention has been shown as an arrangement for providing optimum or economic load assigning indications and control actions for the three plants of a typical electric power generation and distribution system, the configuration of which is shown diagrammatically in FIG. 2. While the system of FIG. 2, to which the FIG. 1 apparatus is applied, has been shown by way of illustration and example as having only the three generating plants illustrated, it should be borne in mind that the method and apparatus of the invention are applicable to systems having any number of generating plants, and to systems having certain selected plants under the control of the apparatus of the invention and having other plants which, for one or another reason, are not subject to the economic load assigning operation provided by this apparatus. Also, the method and apparatus of the invention are applicable to systems wherein the outputs of certain of the system plants are controlled automatically by the apparatus of the invention while the outputs of certain of others of the system plants are controlled manually in accordance with information or data provided by the apparatus. Moreover, the invention is applicable to systems wherein all of the plants are under automatic control or are under manual control.

However, for simplicity of description and explanation, it will be assumed herein that the system of FIG. 2 includes only the illustrated three generating plants, and that all of these plants have their outputs or generation assigned or controlled in an optimum economic manner by the FIG. 1 apparatus according to the present invention. Thus, the loads are assigned to the three plants of the FIG. 2 system by the FIG. 1 apparatus in accordance with the incremental costs of delivered energy for the plants so as to coordinate the incremental transmission losses and incremental generating costs in the system to the ends of securing the most economical combination of loadings for the three plants, and the most economical operation of the system, under the existing system conditions.

The three plants of the system shown diagrammatically in FIG. 2 have been designated therein, and in FIG. 1, as Plant No. 1, Plant No. 2, and Plant No. 3. This system also includes a plurality of substations whose loads make up the total system load. These substation loads are represented by the small circles shown in FIG. 2. It is noted in this connection that the operation of the apparatus according to the invention is not in any way limited to a system having the particular number, position, and connection of loads shown by way of example in FIG. 2, but instead is operative with any system line and load configuration. Thus, the FIG. 2 system could well include other loads and lines in addition to or instead of those shown, and could well include other system components, such as tie lines to other systems. However, for the purpose of avoiding undue complexity of the drawings and description, it will be assumed herein that the system with which the FIG. 1 apparatus is operative includes only the components and connections shown in FIG. 2.

For the purpose of facilitating the following description, the reference characters or numerals employed to denote the components or elements associated with Plant 1 are in the 100 series, the reference characters for the components associated with Plant 2 are in the 200 series, and so on. Reference characters below 100 denote components which are not individual to or individually associated with any one particular plant.

As shown, the FIG. 2 system also includes a dispatching office or location which is generally designated by the rectangle bearing the reference character or numeral 1, and at which the apparatus of FIG. 1 is assumed to be located. Separate plant load communication and/or control channels, such as telemetering or telephone channels, are provided between the dispatching office 1 and each of the three system plants. These channels are designated in FIGS. 1 and 2 by the reference characters 100, 200, and 300, and are individual to Plants 1, 2, and 3, respectively. The purpose of these channels is to permit the optimum plant loading values determined by the FIG. 1 apparatus at the location 1 to be assigned to the respective plants, either manually or automatically, as desired. The individual channels 100, 200, and 300 could, of course, be replaced by a single communication circuit under appropriate circumstances.

Further reference to the components of the FIG. 2 system will be made hereinafter in connection with the description of the FIG. 3 analog of the system of FIG. 2.

The purpose of the economic load assigning apparatus of FIG. 1 is to provide a measure or indication of the load or output which each of Plants 1, 2, and 3 should have in order that the resulting combination of plant outputs be the most economical one under the corresponding system load conditions. More specifically, the purpose of the FIG. 1 apparatus is to provide an indication of the optimum or economic loading for each of Plants 1, 2, and 3 for any given value of total system load within the operating range of the system, such loadings being those which cause the plants to divide the given total system load in the most economical manner, which cause the plants to operate in economic balance and with equal incremental costs of delivered energy, and which cause the system to operate with a minimum total cost of delivered energy and hence in the most economical manner.

To the end of determining these economic loadings for the three system plants, the FIG. 1 apparatus includes computing and comparing means, generally designated by the numeral 2 and having a computing and comparing portion or computer for each of Plants 1, 2, and 3, and also includes an analog device, generally designated by the labelled rectangle bearing the numeral 3, which simulates the actual system of FIG. 2 and which supplies to the computing portions the necessary data to permit the latter to perform their computing and economic loading-determining operations.

In FIG. 1 the computing portions individual to the respective Plants 1, 2, and 3 are generally designated by the labelled rectangles bearing the respective reference numerals 101, 201, and 301. Although each of these portions is identified as being individual to a corresponding one of the plants of the actual system, it is actually also individual to, and operative in accordance with the operation of, the corresponding one of the simulated plants which are included in the simulated system or system analog 3.

THE SYSTEM ANALOG 3

As shown, the analog device 3 may be an A.C. network analyzer, of the well-known and conventional type, which has been set-up or arranged to simulate the FIG. 2 system. Thus, the device 3 is properly referred to herein as the analog of the actual system, the system analog, or simply the simulated system. This system analog includes the usual units or elements for representing or simulating generating units or system plants, the elements constituting simulated Plants 1, 2, and 3 being designated in FIG. 1 by the respective reference numerals 102, 202, and 302. The system analog 3 also includes the usual impedance units, not shown in FIG. 1, which represent in a condensed manner the transmission lines, substation loads, capacitors, etc. of the actual system. The units constituting the simulated lines and loads of the FIG. 2 system will be referred to and described more fully hereinafter in connection with the detailed showing of a portion of the simulated system appearing in FIG. 3.

In addition to the foregoing, the system analog 3 is provided with means, in the form of a knob 4 having a cooperating pointer and scale assembly 5, for adjusting the load conditions under which the system analog operates at any given time. In other words, the knob 4 adjusts the simulated load of the system analog, or simply the load on the simulated system. Thus, by the proper adjustment of the knob 4, the system analog 3 can be made to simulate the operation of the actual system under any desired value of total system load within the operating range of the actual system and the system analog. Consequently, the simulated system can be adjusted, by means of the knob 4, to represent the dynamic operation which the actual system would have or is having for different total loads thereon. The specific manner by which the adjustment of the knob 4 adjusts the load elements of the simulated system to correspond to various values of load on the actual system will be described hereinafter in connection with the details of the simulated system shown in FIG. 3.

To complete the description of the system analog 3 as broadly shown in FIG. 1, it is noted that arrangements are made to adjust the simulated system as necessary to take into account changes in the constants or configuration of the actual system, whether these changes be actual, contemplated, or experimental ones. Specifically, the system analog is shown in FIG. 1 as being arranged to receive such system constant data over a path 6. Also, for the purpose of supplying the necessary phase angle and load data for the simulated system to the computing portions 101, 201, and 301, the system analog is provided with the plurality of terminals shown along its lower edge in FIG. 1. The specific signals and information furnished to the computing portions from the simulated system by way of these terminals will be described below in connection with the description of the computing portions.

THE PORTIONS 101, 201, AND 301

The specific purpose of the computing and comparing and load assigning portions 101, 201, and 301, is to determine and provide a measure of the optimum load which each of the system plants should carry in order that the system operate in the most economical manner for the existing total system load conditions. To this end, the portions 101, 201, and 301 are arranged and operative to adjust the plant-simulating elements or devices of the system analog in the manner necessary to cause the outputs of these simulated plants to have at all times the values which cause the simulated plants to be in economic balance. The significance of these optimum loading values for the simulated plants for any given load conditions on the simulated system is that these values correspond to the optimum loading values for the actual system plants for the same load conditions on the actual system. In other words, the measured value of the output of a simulated plant which causes the latter to be in economic balance with the other simulated plants under certain system load conditions bears a known and constant relationship to the optimum value for the output of the corresponding actual plant for the same load conditions on the actual system. Therefore, by determining these optimum values for the simulated plant outputs, the computing portions 101, 201, and 301 serve their intended purpose of providing measures of the optimum loadings for the actual plants.

By virtue of the above noted relationship between the optimum load values for the outputs of the simulated and actual plants for a given condition of system load, the measured outputs of the simulated plants can conveniently be thought of as being of the same order of magnitude as the corresponding actual loads for the corresponding actual plants, even though the outputs of the simulated plants are obviously many times smaller than the outputs of the actual plants. Thus, it is practically convenient to refer to the simulated plant outputs in the same terms as those applicable to the corresponding actual plant outputs, in the same way that it is convenient to refer to the loads on the simulated system in the same terms as those applicable to the corresponding loads on the actual system. For example, the simulated plant loads may be conveniently expressed in terms of kilowatts or megawatts, while the load on the simulated system may be expressed in terms of megawatts. Accordingly, as referred to herein, the plant and system loads for the simulated system will be expressed or assumed to be expressed in the same terms as their actual counterparts in the actual system.

To the end of providing the foregoing optimum values for the outputs of the simulated plants, corresponding to economic balance between these plants, each of the computing portions 101, 201, and 301 includes means for determining when the corresponding simulated plant is in economic balance with respect to a reference point in the simulated system corresponding to a common, chosen reference point in the actual system. Thus, this means operates in accordance with the reference point comparison method described hereinbefore. Accordingly, when each simulated plant is in economic balance with respect to the simulated reference point, all of the simulated plants are in economic balance with respect to each other, as is desired.

Specifically, said means in each of the portions 101, 201, and 301 is operative in accordance with the foregoing economic balance comparison Equation 4 to compare continuously the incremental transmission loss and the incremental generating cost for the corresponding simulated plant, expressed as the ratios of Equation 4, in order to determine continuously whether or not said plant is in economic balance with respect to the simulated reference point, and to detect any departure from such balance. This requires that each of the portions 101, 201, and 301 be supplied with the existing values of the following quantities included in Equation 4:

(1) The value of the bus voltage phase angle $\theta_n$ for the corresponding simulated plant;

(2) The value of the phase angle $\theta_0$ of the reference voltage at the simulated reference point O;

(3) The value of the output $P_n$ of the corresponding simulated plant; and (4) The value of the arbitrary reference generating cost $F_0$ for the simulated reference point O.

The manner in which the existing value of each of these quantities is supplied to the portions 101, 201, and 301 will now be described.

The values of the voltage phase angles $\theta_n$ and $\theta_0$ are derived from appropriate points in the simulated system 3, and are supplied to the corresponding computing portions 101, 201, and 301 by respective conductors 103, 104, 203, 204, 303, and 304. Specifically, voltages or signals having the phase angles $\theta_0$, $\theta_1$, $\theta_2$, and $\theta_3$ are provided at the aforementioned plurality of terminals shown at the lower edge of the simulated system 3, and are applied to the appropriate computing sections by the correspondingly labelled ones of multiple conductors 103, 104, 203, 204, 303, and 304. For example, a signal having the simulated Plant 1 bus voltage phase angle $\theta$, is supplied to the portion 101 by the conductor 103, while a signal having the reference phase angle $\theta_0$ is supplied to each of the portions 101, 201, and 301 by the respective conductors 104, 204, and 304. These phase angle signals supplied to the computing portions enable the latter to determine the existing values of the phase angles $\theta_{1-0}$, $\theta_{2-0}$, and $\theta_{3-0}$ needed for the solution of the corresponding Equation 4 in each computing portion.

The values of the simulated plant outputs $P_1$, $P_2$, and $P_3$, for simulated Plants 1, 2, and 3, respectively, are obtained in a suitable manner in the respective computing portions from current and voltage signals which are derived from appropriate points in the outputs of the simulated plants in the simulated system, and which are supplied to the corresponding computing portions by the aforementioned conductors 103, 203, and 303, as shown in FIG. 1. These values of simulated plant output are advantageously displayed by means of suitable indicators or meters 105, 205, and 305 which are included in the portions 101, 201, and 301, respectively.

The value of the common arbitrary reference generating cost $F_0$ is established in each of the portions 101, 201, and 301 by the adjustment of the corresponding one of adjustable resistors 106, 206, and 306. These resistors are adjusted in unison by the portion 101 in a manner and for a purpose to be described hereinafter.

The values of the other quantities included in Equation 4—namely, the values of the constant reactance-resistance ratios $K_n$ and the plant generating costs $F_n$ for each simulated plant—are introduced into the circuits of the computing portions in manners which will be explained hereinafter in connection with the detailed showing of FIG. 3.

The optimum or economic loading for each of actual Plants 1, 2, and 3, as determined by the corresponding computing portion, is displayed by a respective one of scale and pointer assemblies 107, 207, and 307, as shown in FIG. 1. The pointers of these assemblies are actually positioned in accordance with the values of the outputs of the simulated plants which cause the latter to be in economic balance. However, in view of the relationship explained above between the output values of the simulated and actual plants, the scales of the assemblies 107, 207, and 307 are advantageously calibrated in terms of the actual loadings in kilowatts or megawatts for the actual plants. Thus, the load values indicated by the positions of the pointers along the scales of the assemblies 107, 207, and 307 when the simulated plants are in economic balance are the actual, numerical optimum or economic loadings for the actual plants.

For the purpose of providing for the automatic control of the outputs of the actual Plants 1, 2, and 3, when desired, in accordance with the economic load values displayed therefor by the respective assemblies 107, 207, and 307, the pointer of each of these assemblies is coupled by a corresponding one of mechanical linkages 108, 208, and 308 to a corresponding one of suitable, conventional telemetering transmitters 109, 209, and 309. Each of the latter is arranged to send to the corresponding plant the command or control signals necessary to cause the plant to assume the load value indicated by the corresponding assembly 107, 207, or 307. Such control signals are sent in the usual manner from each of the transmitters at the location 1 to the respective one of the actual plants over the respective one of the aforementioned channels 100, 200, and 300.

As was noted hereinbefore, the portions 101, 201, and 301 position the pointers of the respective optimum load indicating assemblies 107, 207, and 307 in accordance with the values of the outputs of the simulated plants which correspond to economic balance between these plants. The portions 101, 201, and 301 accomplish this by adjusting or regulating the outputs of the plant simulating devices or simulated plants of the system analog 3 to the values which cause economic balance Equation 4 to be satisfied for each simulated plant, and which thus cause the simulated plants to be in economic balance. To this end, each of portions 201 and 301 is shown as being arranged to adjust the output of the corresponding one of simulated plants 202 and 302 by means of a respective one of mechanical linkages 210 and 310. As will be explained in more detail hereinafter in connection with FIG. 3, each of the portions 201 and 301 directly adjusts the output of the respective one of simulated plants 202 and 302, through the respective one of linkages 210 and 310, as necessary to cause the value of the output of the corresponding simulated plant, as indicated by the respective one of indicators 205 and 305, to be equal to the economic value determined by the apparatus for that plant in accordance with economic balance Equation 4, and established and exhibited by the position of the pointer of the corresponding one of economic load indicating assemblies 207 and 307.

The portion 101 could, if desired, be arranged to adjust the output of the corresponding simulated plant 102 directly, as is done for the simulated plants 202 and 302 as described above. However, it has been found to be convenient, instead, to arrange one of the simulated plants to operate as a so-called manual or slack plant, and to have the output of this plant regulated or controlled indirectly as necessary to maintain this plant in economic balance. In the arrangement of FIG. 1, simulated plant 102 has been chosen and arranged to operate as such a slack plant.

Accordingly, the portion 101 does not directly adjust the output of the simulated plant 102, but instead is arranged to regulate this output indirectly by being arranged to adjust all of the arbitrary reference generating cost resistors 106, 206, and 306 in unison as briefly mentioned hereinbefore. The portion 101 so adjusts these $F_0$ resistors 106, 206, and 306 in the manner necessary to cause the value of the output of the simulated plant 102, as indicated by the indicator 105, to be equal to the economic value for this output as determined by the portion 101 in accordance with economic balance Equation 4, and as established and exhibited by the position of the pointer of the economic load indicating assembly 107.

Such adjustment of the resistors 106, 206, and 306 is operative to adjust the output of the simulated plant 102 to the economic value therefor because of the fact that such adjustment of those resistors changes the values of the temporary economic loadings determined for simulated plants 202 and 302, and hence changes the outputs of these plants. These changes in the outputs of simulated plants 202 and 302 result in changes in the output of simulated plant 102, since this output makes up the required difference between the sum of the outputs of simulated plants 202 and 302, and the sum of the loads and losses in the simulated system.

In the FIG. 1 arrangement, the several $F_0$ resistors 106, 206, and 306 are adjusted in unison by a servo motor 111 of the portion 101 through a mechanical linkage 7. As will be shown hereinafter, the motor 111 is responsive to any inequality between the value of the output of simulated plant 102 and the optimum value of this output as represented by the position of the pointer of the assembly 107. Thus, the motor 111 adjusts the $F_0$ resistors 106, 206, and 306 as necessary to maintain equality between the existing and optimum values of the output of simulated plant 102. This motor 111 in the portion 101 is the counterpart of the motor, not shown in FIG. 1, which is located in each of the portions 201 and 301 for adjusting the corresponding simulated plant by means of the sponding one of the linkages 210 and 310.

OPERATION OF THE FIG. 1 APPARATUS

As has been stated hereinbefore, the purpose of equipping the system of FIG. 2 with the economic load assigning apparatus of FIG. 1 is to make possible the most economical operation of the system. In other words, it is the purpose of the FIG. 1 load assigning apparatus to assign to the loads or outputs of Plants 1, 2, and 3 the values necessary to cause these plants to operate with equal incremental costs of delivered energy, and to cause the total generated power in the system to be so divided or proportioned among Plants 1, 2, and 3 as to provide the most economical combination of plant loadings, and operation of the system at a minimum total cost of delivered energy. In achieving this operation, the FIG. 1 apparatus determines the optimum loadings for achieving economic balance between the simulated plants 102, 202, and 302 of the analog 3 of the actual system operating under the same conditions as those for the actual system. Said optimum loadings for the simulated plants, as exhibited by the assemblies 107, 207, and 307, are indicative of the optimum or economic loadings for the plants of the actual system when operating under said same conditions.

In accordance with the foregoing, each of the computing and load assigning portions 101, 201, and 301 is operative in accordance with the foregoing reference plant comparison method and economic balance Equation 4 to determine continuously whether or not the corresponding simulated plant is in economic balance with the simulated reference point O, and to effect automatically the necessary change in the output of the simulated plant to return the latter to economic balance if the effected economic balance determinations indicate that this plant is not in economic balance. Specifically, each of the portions 101, 201, and 301 computes the incremental transmission loss ratio for the corresponding simulated plant on the basis of the phase angle between the reference point voltage and the plant bus voltage of the simulated system 3; and also computes the corresponding incremental generating cost ratio for this plant on the basis of the simulated plant output and the operating cost of the corresponding actual plant. Each portion effects a continuous comparison between these loss and cost ratios according to Equation 4, and detects any economic unbalance between the simulated plant and the simulated reference point by detecting any deviation between the above loss and cost ratios.

On occurrence of such deviation, the apparatus operates in accordance with this deviation to change the simulated plant outputs as necessary to reduce this deviation to zero, to satisfy the balance equations, and to return the simulated plants to economic balance with the reference point. Since this operation takes place continuously for the three simulated plants, whereby each of these plants is controlled to be in economic balance with the reference point, it is apparent that this operation causes all of the simulated plants to be maintained in economic balance with each other.

For a given load set into the simulated system 3 by means of the knob 4, the pointers of the assemblies 107, 207, and 307 will be positioned in accordance with the amount of generation which can be carried most economically by each of the Plants 1, 2, and 3 of the actual system for said given load thereon. If, for example, the load for which the simulated system is adjusted is the actual load existing at that time on the actual system, the plant load values displayed by the assemblies 107, 207, and 307 will be those which, when assumed by the respective actual plants, will cause the latter to operate in economic balance, and hence in the most economical manner, for said existing load on the actual system. For the condition of economic balance between the simulated plants 101, 202, and 302, the simulated plant output value indicated by each of the indicators 105, 205, and 305 will be equal to the corresponding economic plant loading value then displayed by the corresponding one of the assemblies 107, 207, and 307.

By means of the transmitters 109, 209, and 309, in cooperation with suitable receivers and load controllers of conventional type located at the actual system plants, the latter can be made to assume the foregoing displayed economic plant loading values automatically. In some cases, however, it may be sufficient merely to note the economic plant loading values displayed by the assemblies 107, 207, and 307, and to transmit this information orally to the appropriate plants to enable the operating personnel at the plants to load the latter to the displayed economic values.

By way of a further example, it is noted that the FIG. 1 apparatus can be employed to compute and indicate the economic combination of plant loadings corresponding to a system load which is different from that existing on the actual system at the time. For example, the knob 4 may be adjusted to place on the simulated system 3 a value of load which, it is known, will be the actual system load at some future time. One purpose of operating the apparatus in this manner would be to permit the preparation of future economic generating schedules. Another purpose of such operation would be to predict the behavior of the actual system under such a load condition. Alternately, the load set onto the simulated system could be an arbitrary one, the resulting displayed economic loading values there being used, for example, to show what loads the actual plants would be called upon to produce to provide economic system operation in the event that such system load conditions should ever materialize on the actual system.

Thus, the FIG. 1 apparatus may be employed, as just described, for the purpose of effecting the manual or automatic control of an actual system in the most economical manner, or for the purpose of providing data to be used in preparing present or future generating schedules or for predicting future real or hypothetical system plant operation. Whether this apparatus is used for the above purposes or for some other purpose, the operation of the apparatus in determining the economic plant loading value combination corresponding to the load set onto the simulated system is the same in all cases.

As long as the FIG. 1 apparatus is in the balanced condition, as it is as long as all of the simulated plants are in economic balance, no adjustments are made to the outputs of the simulated plants or to the $F_0$ resistors. Upon the occurrence of a change in the value of some condition, such as the load on the simulated system, which causes an unbalance to occur between the incremental transmission loss and generating cost ratios for one or more of the simulated plants, the latter will no longer have equal incremental costs of delivered energy, and will no longer be in economic balance. The portions 201 and 301 will then adjust the outputs of simulated plants 202 and 302, respectively, and the portion 101 will adjust the $F_0$ resistors 106, 206, and 306, as necessary to bring the simulated plant outputs to the values which will restore economic balance between the simulated plants, and restore the apparatus to the balanced condition. When this has occurred, the simulated plant output values, as displayed by the indicators 105, 205, and 305, will have been returned to equality with the corresponding economic values as displayed by the assemblies 107, 207, and 307. The manner in which this rebalancing operation takes place will be set forth in greater detail hereinafter in connection with the FIG. 3 apparatus now to be described.

THE APPARATUS OF FIG. 3

Figure 3:
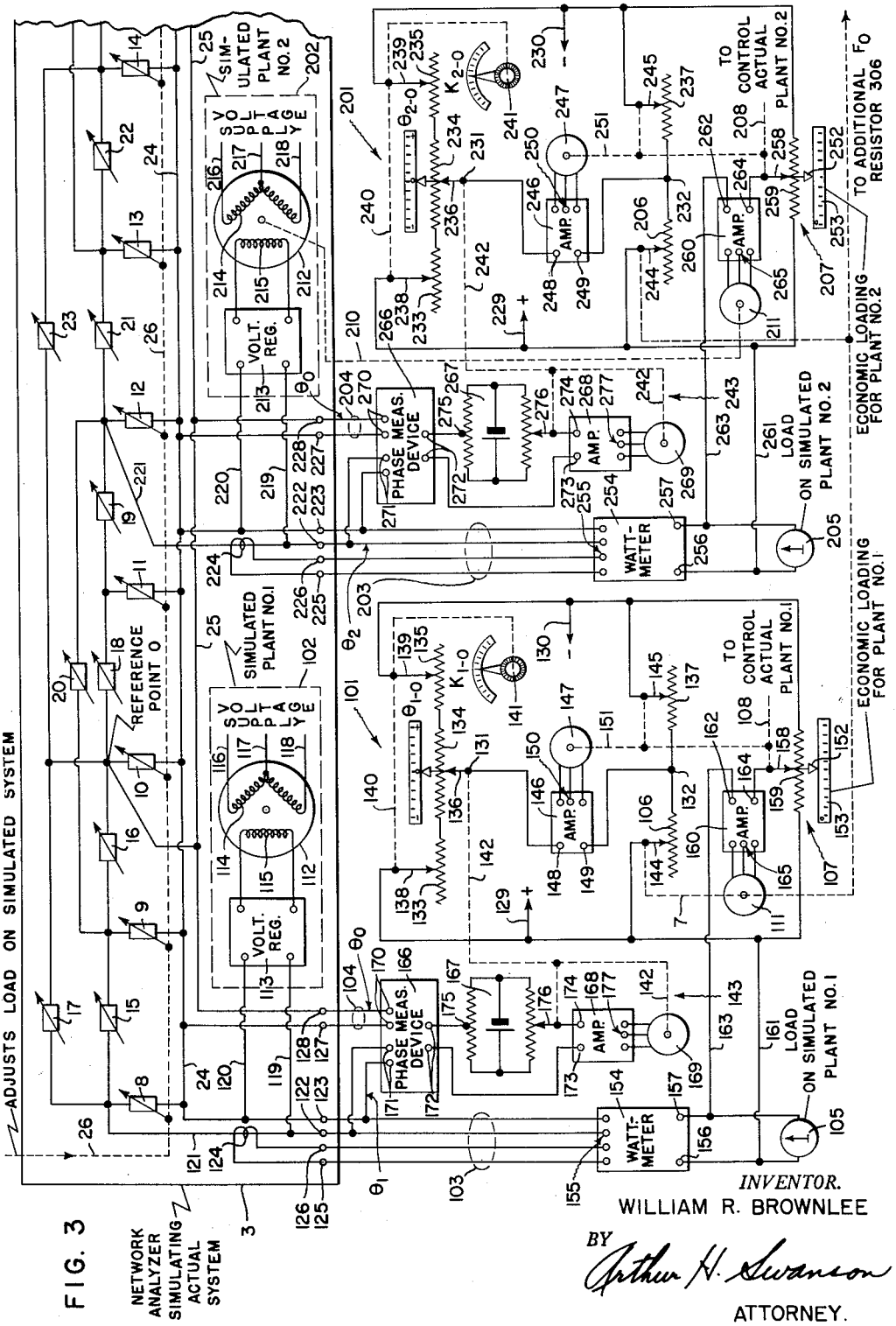
FIG. 3 is a schematic circuit diagram of a form according to the invention which the system analog and the economic balance computing, comparing, and load assigning portions of the FIG. 1 apparatus may take.

FIG. 3 illustrates the details of apparatus embodying the present invention which can be used to advantage as the apparatus shown more broadly in FIG. 1. Specifically, FIG. 3 shows in detail desirable forms which the system analog 3 and the economic balance computing, comparing, and load assigning means 2, including portions 101, 202, and 301, of FIG. 1 may take. For the purpose of avoiding undue complexity of the description and drawing, there is shown in FIG. 3 only the details of apparatus to be employed in the portions 101 and 201. However, it is to be understood that the apparatus of the portion 301 is intended to be, and is assumed herein to be, identical in detail to the illustrated apparatus for the portion 201.

Similarly, in order to avoid undue complexity of the drawing and description, FIG. 3 shows only that part of the system analog 3 which simulates that portion of the actual system shown to the left of the vertical dashed line in FIG. 2. It is noted, however, that the FIG. 3 system analog 3 is assumed to include all of the necessary components to simulate the entire actual system of FIG. 2, just as the system analog 3 of FIG. 1 is broadly shown as doing. The construction and operation of that part of the system analog 3 which is not shown in detail in FIG. 3 are intended and assumed to be the appropriate counterparts, with respect to that portion of the actual system shown to the right of the vertical dashed line in FIG. 2, of those illustrated and described herein for that part of the system analog 3 which is illustrated in detail in FIG. 3.

THE SYSTEM ANALOG 3

In the usual manner for a conventional A.C. network analyzer set up to represent or simulate an actual system, the system analog or simulated system 3 includes, in addition to the units or elements constituting the simulated plants 102, 202, and 302, a first plurality of adjustable impedance units or devices 8 through 14 which represent or simulate in a condensed manner the respective substation loads of the actual system of FIG. 2. These substation loads, or simply system loads, collectively represent the total load of the system.

The reference numerals 8 through 14, which are employed in FIG. 3 to designate the load-simulating impedance units of the system analog, are also shown in FIG. 2 applied to the corresponding small circular symbols which represent the corresponding loads in the FIG. 2 system. Accordingly, the impedance unit 8 of FIG. 3 simulates the load 8 of the actual system shown in FIG. 2, and so on.

In addition to the foregoing, the system analog 3 includes a second plurality of adjustable impedance units or devices 15 through 23 which represent or simulate in a condensed manner the respective transmission lines of the actual system shown in FIG. 2. The reference numerals 15 through 23 are also applied in FIG. 2 to the corresponding lines shown therein connected between the system loads of the actual system. Accordingly, the impedance unit 15 of FIG. 3 simulates the line 15 of the actual system shown in FIG. 2, and so on. Moreover, these line-simulating units and/or the load-simulating units, with or without additional simulating units, can be arranged to simulate any other components, such as capacitors, of the actual system.

Referring now to both of FIGS. 2 and 3 together, it is seen that the simulated system 3 is an accurate analog of the actual system. Thus, the line unit 15 is connected between the load unit 8 to the load unit 9, while the line unit 16 is connected between the load unit 9 to the load unit 10. The load unit 8 is also connected to the load unit 10 by the line unit 17. As will be noted again hereinafter, a voltage point at the load 10 has been chosen as the reference point O of the actual system, whereby the voltage across the load unit 10 of FIG. 3 is taken as the reference point voltage of phase angle $\theta_0$ for the simulated system.

Continuing the description of the simulated system 3, it is seen that the line unit 18 is connected between the load units 10 and 11, while the line unit 19 is connected between the load units 11 and 12. The load units 9 and 12 are also connected by the line unit 20. Finally, the line unit 21 is connected between the load units 12 and 13, the line unit 22 is connected between the load units 13 and 14, and the line unit 23 is connected between the load units 10 and 14.

In addition to the connections just enumerated, the system analog 3 also includes a common conductor 24 which is common to all of the load units and plants of the simulated system. Also a reference voltage conductor 25 extends from the reference point at the upper end terminal of the load unit 10 to the necessary output terminals as will be discussed more fully hereinafter.

As shown in FIG. 3, the adjustable load units 8 through 14 are arranged to be simultaneously adjusted by means of a mechanical linkage 26. It is a portion of this linkage which is shown connected to the simulated load-adjusting knob 4 in FIG. 1. The linkage 26 is advantageously arranged to adjust the units 8 through 14 in accordance with a predetermined pattern or patterns which have been previously found to be applicable. Such operation is made possible by virtue of the fact that, for each value of total system load, there is usually a given pattern for the values of the individual loads making up that value of total system load.

Stated differently, it has been found that, whenever a certain actual system has a given value of total load, this total is made up of substantially the same values for the individual loads, or, in other words, is divided among the individual loads of the system in accordance with substantially the same pattern. Moreover, this condition has been found to exist throughout the range of values of the total system load, each value thereof having a corresponding individual load pattern. Therefore, by ascertaining these patterns in advance for the actual system of FIG. 2, and by arranging the linkage 26 to adjust the load units 8 through 14 relatively in accordance with these previously determined patterns, such adjustment can be properly obtained by means of the manipulation of the single knob 4.

Thus, for each value of total system load set onto the simulated system 3 by means of the knob 4, the load units 8 through 14 are adjusted to have the proper absolute and relative values corresponding to the known pattern by which the individual loads of the actual system would be related for that value of total load on the actual system.

It is noted in connection with the foregoing that the knob 4 and linkage 26 are also arranged to adjust the load units, not shown, in FIG. 3, which are assumed to be included in the system analog 3 to simulate the loads of that portion of the actual system which is at the right of the vertical dashed line in FIG. 2, and for which the details of the analog are omitted in FIG. 3.

By virtue of the foregoing, the proper adjustment of the knob 4 and the linkage 26 causes the system analog 3 to simulate the operation of the actual system of FIG. 2 under any desired value of total system load within the operating range of the actual system and the system analog. Therefore, it is clear that the simulated system 3 can be set up to represent the dynamic operation which the actual system would have or is having for different, specific values of total load thereon.

If desired, the gang-operation or adjustment of the load units 8 through 14 can be modified to take into account any seasonal or other shifts which might occur in the patterns relating total system load to the values of the individual loads. Also, if desired, greater operating flexibility can be achieved by making each of the load units 8 through 14 separately adjustable, as by providing each of these units with a separate adjusting knob like the knob 4. However, the particular arrangement disclosed by way of example in FIG. 3 will be found to be adequate for the present purposes.

In the usual manner, the line-simulating impedance units 15 through 23 are made adjustable to permit the simulated system to be set up in accordance with the existing values of the constants of the actual system which is being simulated. The adjustability of these units also permits the simulated system to be continually changed in accordance with corresponding actual, contemplated, or experimental changes occurring in the actual system, and hence as necessary to keep the simulated system in accurate correspondence with the actual system. Thus, changes and additions to the actual system are duplicated in the simulated system by the adjustment, addition, or removal of the corresponding line units.

Finally, the system analog 3 as shown in FIG. 3 includes the plant-simulating units or simulated plants 102 and 202 which represent, in the conventional manner the respective actual Plants 1 and 2. Simulated plant 302 of the system analog, not shown in FIG. 3, is intended and assumed herein to be identical to the illustrated simulated plants 102 and 202, which are seen to be identical to each other.

The simulated plant 102 comprises, in the usual manner, a phase shifter 112 and a voltage regulator 113. The phase shifter 112 includes the usual three-phase primary winding 114 and cooperating secondary winding 115. The primary winding 114 is connected by conductors 116, 117, and 118 to a suitable source of three-phase A.C. energizing voltage, not shown. The phase shifter secondary winding 115 is connected through the voltage regulator 113 to output conductors 119 and 120, between which the output of simulated plant 102 is produced.

The output of simulated plant 102 is applied to the simulated system at the proper point therein by the connection of the output conductors 119 and 120 across the load-simulating unit 8. Specifically, the plant output conductor 120 is connected to the common conductor 24, and thence to the lower end terminal of the load unit 8, while the plant output conductor 119 is connected to the upper end terminal of the load unit 8 by a conductor 121. These connections not only apply the output of simulated plant 102 across the load unit 8, but also apply this output between the line-simulating units 15 and 17 and the common conductor 24. Accordingly, this application of the output of simulated plant 102 to the simulated system is fully analogous to the illustrated application of the output of Plant 1 to the load 8 and to the lines 15 and 17 of the actual system as shown in FIG. 2.

The output voltage of simulated plant 102 is also applied between output terminals 122 and 123 of the system analog, this being accomplished by the connection of the terminals 122 and 123 to the respective plant output conductors 119 and 120. This voltage has the simulated system phase angle $\theta_1$ of the output or so-called bus voltage of simulated plant 102, and is utilized by the portion 101 in the solution of the economic balance Equation 4 therein, as will be explained more fully hereinafter.

Associated with the conductor 121 is a current transformer secondary winding 124 whose output is proportional to the output current supplied by simulated plant 102 to the simulated system. This output current signal from the transformer winding 124 is applied between output terminals 125 and 126 of the system analog, to be used along with the voltage between the output terminals 122 and 123 in providing a measure of the power output or load of simulated plant 102 delivered to the simulated system.

In the same manner as for the simulated plant 102 as just described, simulated plant 202 includes a phase shifter 212 having a primary winding 214 connected by conductors 216, 217, and 218 to the source of three-phase A.C. energizing voltage, not shown, employed to energize the phase shifter 112 of simulated plant 102. The phase shifter 212 also includes a secondary winding 215 which is connected through a voltage regulator 213 to output conductors 219 and 220, between which the output of simulated plant 202 is produced.

The output of simulated plant 202 is applied to the simulated system at the proper point therein by the connection of the output conductors 119 and 120 across the load-simulating unit 12. Specifically, the plant output conductor 220 is connected to the common conductor 24, and thence to the lower end terminal of the load unit 12, while the plant output conductor 219 is connected to the upper end terminal of the load unit 12 by a conductor 221. These connections not only apply the output of simulated plant 202 across the load unit 12, but also apply this output between the line-simulating units 19, 20, and 21 and the common conductor 24. Accordingly, this application of the output of simulated plant 202 to the simulated system is fully analogous to the illustrated application of the output of Plant 2 to the load 12 and to the lines 19, 20, and 21 of the actual system as shown in FIG. 2.

The output voltage of simulated plant 202 is also applied between output terminals 222 and 223 of the system analog, thus being accomplished by the connection of the terminals 222 and 223 to the respective plant output conductors 219 and 220. This voltage has the simulated system phase angle $\theta_2$ of the output or so-called bus voltage of simulated plant 202, and is utilized by the portion 201 in the solution of the economic balance Equation 4 therein, as will be explained more fully hereinafter.

Associated with the conductor 221 is a current transformer secondary winding 224 whose output is proportional to the output current supplied by simulated plant 202 to the simulated system. This output current signal from the transformer winding 224 is applied between output terminals 225 and 226 of the system analog, to be used along with the voltage between the output terminals 222 and 223 in providing a measure of the power output or load of simulated plant 202 delivered to the simulated system.

The supply voltage for energizing the phase shifters of the simulated plants may be derived from any convenient source. For convenience in operating the system analog, this energizing voltage should have a reasonably constant frequency equal to the frequency of the actual system.

As was noted hereinbefore, the voltage across the load unit 10 is taken as the reference voltage of the simulated system, corresponding to the voltage of the reference point O at the load 10 of the actual system. This reference voltage for the simulated system, having the simulated system phase angle $\theta_0$, appears between the reference conductor 25 and the common conductor 24, and is applied between system analog output terminals 127 and 128 for use in the portion 101, and between output terminals 227 and 228 for use in the portion 201.

As will be readily apparent from the foregoing, the system analog 3 supplies to the computing portions 101 and 201, from its output terminals 122, 123, 125, 126, 127, 128, etc., the simulated system values of the phase angles and simulated plant loads or outputs needed by the portions 101 and 201 in their computation of the economic loadings for the simulated plants. In the same manner as for the portions 101 and 201, the system analog 3 also supplies the needed phase angle and load values to the portion 301, as indicated generally in FIG. 1.

THE PORTIONS 101 AND 201

As has been explained hereinbefore, the general purpose of the portions 101 and 201, together with the portion 301, is to control the outputs of the simulated plants as necessary to maintain the latter in economic balance with respect to the simulated reference point, and hence with respect to each other. A specific purpose of the portion 101 is to compute the existing values of the incremental transmission loss and incremental generating cost ratios of Equation 4 associated with simulated plant 102, and to use these ratios in determining, in accordance with Equation 4, whether or not this simulated plant is in economic balance with respect to the simulated common reference point. Similarly, a specific purpose of the portion 201 is to perform the foregoing operations with respect to simulated plant 202.

A further specific purpose of the portion 201 is to adjust the output of simulated plant 202, in accordance with the results of the economic balance determinations effected for this plant, as necessary to establish equality between the corresponding loss and cost ratios, to maintain the economic balance Equation 4 satisfied for this plant, to maintain this plant in economic balance, and hence to cause the assembly 207 to indicate the economic loading for this plant. A further specific purpose of the portion 101 is to adjust the several reference generating cost resistors 106, 206, and 306, in accordance with the results of the economic balance determinations effected for simulated plant 102, as necessary to change the output of this plant, by changing the outputs of the other simulated plants, until equality is established between the cost and loss ratios for this plant. This effective adjustment of the output of simulated plant 102 is in the direction to establish and maintain economic balance Equation 4 satisfied for this plant, to maintain the latter in economic balance, and hence to cause the assembly 107 to indicate the economic loading for this plant.

To this end, the portion 101 includes a computing and comparing bridge circuit having input or energizing terminals 129 and 130, and having output terminals 131 and 132. A first adjustable resistor 133, the body of a slide wire resistor 134, and a second adjustable resistor 135 are connected in series in the order stated in a first branch between the energizing terminals 129 and 130. The adjustable contact 136 of the slide wire resistor 134 is connected to the bridge output terminal 131.

The adjustable resistor 106 and an adjustable resistor 137 are connected in series in a second branch between the energizing terminals 129 and 130, the junction between these resistors forming the bridge output terminal 132. Thus, the bridge circuit is made up of the adjustable resistors 133, 135, 106, and 137 and the slide wire resistor 134. The energizing terminals 129 and 130 are arranged, as shown, to be connected to a suitable source of direct energizing voltage, not shown.

LOSS RATIO COMPUTATION

The purpose of the first or upper branch of the bridge circuit of the portion 101 is to compute the existing value of the incremental transmission loss ratio of Equation 4 for this portion, and to produce a potential or signal which is proportional in magnitude to this value. To this end, the adjustable resistors 133 and 135 of the bridge circuit are employed for introducing into the bridge circuit, and the computations made thereby, the existing numerical value of the constant reactance-resistance ratio for simulated plant 102 with respect to simulated reference point O, $K_{1-0}$. For this purpose, the respective adjustable contacts 138 and 139 of these two resistors are mechanically ganged together, and are arranged to be adjusted along their respective resistors to a position representative of the existing value of $K_{1-0}$. Specifically, the contacts 138 and 139 are arranged to be manually positioned through a suitable mechanical linkage 140 by means of a knob 141. A scale and pointer arrangement cooperating with the knob 141 facilitates the proper manual adjustment of the effective resistances of the resistors 133 and 135 in accordance with the numerical value of the constant $K_{1-0}$, in a manner which is described in detail hereinafter.

The slide wire resistor 134 is employed for introducing into the bridge circuit, and the computations which it effects, the existing numerical value of the phase angle $\theta_{1-0}$ between the bus voltage of simulated plant 102 and the reference voltage of simulated reference point O. To this end, the contact 136 is arranged to be positioned along the slide wire 134 in accordance with this phase angle value. This is done by means of a suitable mechanical linkage 142 which is actuated by a phase angle determining arrangement 143, to be described hereinafter. It is sufficient to note at this point that the slide wire 134 is a so-called zero center device, and that the arrangement 143 positions the contact 136 on the slide wire 134 to the right of the zero position when the simulated plant bus voltage leads the reference voltage and $\theta_{1-0}$ is thus positive, and positions the contact 136 to the left of the zero position when the bus voltage lags the reference voltage and $\theta_{1-0}$ is thus negative. Moreover, the arrangement 143 so positions the contact 136 on the slide wire 134 that the distance of the contact from the zero center position at any time is a measure of the existing value in electrical degrees of the phase angle $\theta_{1-0}$. Therefore, the position of the contact 136 on the slide wire 134 is a measure of both the magnitude and sense or sign of the existing phase angle $\theta_{1-0}$.

By virtue of the foregoing, the upper bridge branch including the K resistors 133 and 135 and the phase angle slide wire 134 computes and provides the effect or signal which is proportional in magnitude to the existing numerical value of the right-hand, incremental transmission loss ratio term of balance comparison Equation 4. As noted hereinbefore, the magnitude of this loss signal is a function of solely $K_{1-0}$ and $\theta_{1-0}$, being a linear function of $\theta_{1-0}$. This loss signal appears on the contact 136, and hence on the bridge output terminal 131, and is of a value, with respect to a point midway in potential between the bridge energizing terminals 129 and 130, which is proportional to the existing numerical value of the loss ratio term of Equation 4.

COST RATIO COMPUTATION

The second or lower branch of the bridge circuit of portion 101, containing the adjustable resistors 106 and 137, is provided for the purpose of computing the existing value of the incremental generating cost ratio of Equation 4 for portion 101, this cost ratio being equal in value to the foregoing loss ratio when simulated plant 102 is in economic balance. Also, the purpose of this lower bridge branch is to produce a potential or signal which is proportional in magnitude to the value of this cost ratio, which is equal to the value of the above described loss signal when economic balance conditions for simulated plant 102 exist, and which is arranged to be compared with said loss signal in order to detect any economic unbalance for this plant.

To this end, the adjustable resistor 106 is employed for introducing into the bridge circuit, and the computations made thereby, the value of the arbitrary reference generating cost $F_0$. To accomplish this, the contact 144 of the resistor 106 is arranged to be positioned along the latter by the linkage 7 in accordance with any difference between the value indicated by the assembly 107 and the value of the output of the simulated plant 102, as previously noted. At any given time, the position of the contact 144, and hence the effective resistance of the resistor 106, are representative of the arbitrary cost $F_0$ assigned to power at a reference point O in the simulated system. The specific manner in which this adjustment is achieved will be described hereinafter.

The adjustable resistor 137 is employed for introducing into the bridge circuit and its computations the existing value of the incremental generating cost $dF/dP$ for the simulated plant 102. Thus, the effective resistance value of the resistor 137 is arranged and controlled to be proportional to the value of this incremental generating cost. To this end, the resistor 137 is characterized in accordance with the composite input-output or boiler-turbine characteristic of actual Plant 1, and has its resistance proportioned in accordance with a design value for the price or cost of fuel at actual Plant 1. Also, the contact 145 is arranged to be positioned along the resistor 137 according to the value of output of simulated plant 102 which causes Equation 4 to be satisfied at any given time, as will be described more fully below.

By virtue of the foregoing, the lower bridge branch including the resistors 106 and 137 computes and provides the effect or signal which is proportional in magnitude to the existing value of the left-hand, incremental generating cost ratio term of Equation 4 for portion 101. This cost signal appears at the bridge output terminal 132, and is of a value, with respect to a point midway in potential between the bridge energizing terminals 129 and 130, which is proportional to the existing numerical value of the cost ratio term of Equation 4. This cost signal is equal in value to the foregoing loss signal when economic balance conditions exist for simulated plant 101, at which time the contact 145 will have been positioned so as to balance the bridge circuit and reduce to zero the potential difference between the bridge output terminals 131 and 132.

The characterized resistor 137 may be wound in the usual manner to have the desired characteristic, or may well be of the known type wherein the characterization is adjustable by suitable means. Alternatively, the contact 145 can be arranged to be positioned by a cam which is suitably shaped in accordance with the necessary characteristic. Also, by the proper adjustment of resistor 106 relative to the linkage 7 and the other $F_0$ resistors, compensation can be effected for changes in the cost of fuel at actual Plant 1 from the cost originally assumed in proportioning resistor 137, and for changes which affect the operating efficiency of actual Plant 1, and hence cause the plant to operate with a different characteristic from that for which the resistor 137 was originally characterized.

BALANCE DEVIATION DETECTION AND BRIDGE BALANCING

As was previously noted, the portion 101 effects a continuous comparison between the foregoing incremental transmission loss and generating cost ratio signals so as to detect any deviation between these signals, and hence any deviation between the corresponding cost and loss ratios, any such deviation being representative of a deviation from economic balance for simulated plant 102. This signal comparison is effected by comparing the signals or potentials produced on the bridge output terminals 131 and 132, or, more specifically, by comparing the potential of the terminal 131 with that of the terminal 132. This amounts to detecting the potential difference or potential, if any, produced between the terminals 131 and 132. The value of this potential or deviation signal is zero as long as the loss and cost signals and ratios are equal. Any unbalance between the incremental transmission losses and generating costs for simulated plant 102 causes the bridge to produce an output signal between the output terminals 131 and 132 of a magnitude and polarity which are respectively representative of the magnitude and direction of such unbalance, and of the departure from economic balance conditions for the simulated plant 102 as seen by the bridge circuit.

The presence of such a bridge output signal is indicative of the need for a change in the output of simulated plant 102 in order to return the plant to economic balance. As a first step toward this end, the apparatus is arranged to adjust the contact 145 along the resistor 137 to the position at which the bridge is rebalanced and the bridge output signal is reduced to zero. This amounts, as far as the bridge circuit is concerned, to assigning a new value of load to simulated plant 102, since the position of the contact 145 is representative of the output value of this plant in the bridge circuit computations. This bridge balance position of the contact 145 actually represents the load which simulated plant 102 should have in order to be in economic balance for the existing phase angle values impressed on the bridge circuit.

As the second step in causing simulated plant 102 to return to economic balance, the output of this plant must be changed toward the value then assigned by the bridge balance position of the contact 145. The apparatus which effects this operation will be described hereinafter, following the present description of the economic balance deviation detecting and bridge circuit balancing apparatus.

For the purpose of effecting the economic balance comparison or balance deviation detection, and for adjusting the contact 145 as necessary to eliminate any such deviation and to balance the bridge circuit, the apparatus includes a null-detecting and motor driving amplifier 146 and a cooperating bridge rebalancing motor 147. The amplifier 146 serves as a bridge output null detector, and is responsive to the magnitude and direction of the bridge output signal to cause the motor 147 to adjust the contact 145 along the resistor 137, in response to economic and bridge unbalance, in the direction and to the extent necessary to reduce the bridge output signal to zero, and hence to rebalance the bridge. Accordingly, the resistor 137 is employed as the rebalancing or follow-up resistor for the bridge circuit, as has been noted hereinbefore.

In accordance with the foregoing, the output terminals 131 and 132 of the bridge circuit are connected to respective input terminals 148 and 149 of the amplifier 146, while output terminals 150 of the latter are connected to the motor 147. The latter is arranged to adjust the contact 145 through a mechanical linkage 151. The amplifier 146 and the motor 147 cooperate continuously to maintain the contact 145 in the position along the resistor 137 which results in balance of the bridge circuit and zero output therefrom.

The rebalancing arrangement including the amplifier 146 and the motor 147 may be of any of the well known forms of such apparatus which are available on the market, and may well be of the type disclosed in the Wills Patent No. 2,423,540. Since the manner in which such arrangements are constructed and are operative to adjust a contact, such as the contact 145, in accordance with the magnitude and polarity of a D.C. voltage, such as the output of the bridge circuit of the portion 101, is well known, no further description of the amplifier 146 or motor 147 is seen to be necessary herein.

Since the contact 145 is adjusted along the resistor 137 to the position which balances the bridge circuit, the bridge balance position of the contact 145 at any time is representative of the value of the output of simulated plant 102 required to balance the incremental transmission losses and generating costs, equalize the loss and cost ratios and corresponding signals, and satisfy Equation 4 for the particular value of the phase angle $\theta_{1-0}$ then applied to the bridge circuit. Accordingly, it is the movement of this contact which is used to position the pointer 152 of the scale and pointer assembly 107, since this pointer, as previously noted, is positioned in accordance with the value of output of simulated plant 102 which represents economic balance for this plant. As shown, the pointer 152 is adjusted along its scale 153, in correspondence with the adjustment of the contact 145 along the resistor 137, by means of the motor 147 and the linkage 151.

While it should be readily apparent from the foregoing that the position of the contact 145 for bridge balance represents the value of $dF/dP$ for simulated plant 102 which would cause this plant to be in economic balance with respect to reference point O for the existing conditions, it will now be shown mathematically that this is true, and that the economic balance Equation 4 would be satisfied for simulated plant 102, for the existing conditions, if the output of this plant were made to have a value corresponding to that represented by the bridge balance position of the contact 145 under those conditions. To this end, let the resistance and voltage between the following points in the portion 101 be designated as follows:

$$145 \text{ to } 132 = a$$
$$144 \text{ to } 132 = b$$
$$139 \text{ to } 131 = c$$
$$138 \text{ to } 131 = d$$

Then, when the bridge circuit is in balance, as shown by the absence of a significant potential difference between the terminals 131 and 132, these quantities are related as shown by the following conventional bridge balance equation:

$$\frac{a}{b} = \frac{c}{d} \qquad (4A)$$

The above bridge balance Equation 4A can also be written as follows:

$$b = \frac{ad}{c}$$

from which the following can be written:

$$\frac{a-b}{a+b} = \frac{a - \frac{ad}{c}}{a + \frac{ad}{c}}$$

$$= \frac{ac - ad}{ac + ad}$$

$$= \frac{c-d}{c+d}$$

Therefore, when the bridge circuit is in balance:

$$\frac{a-b}{a+b} = \frac{c-d}{c+d} \qquad (4B)$$

Further, let:

$T=$ the adjusted resistance value for each of the resistors 133 and 135, and
$S=$ one-half of the total resistance of the resistor 134.

Also, let it be assumed that the span of the adjustment of the contact 136 along the entire length of the resistor 134 covers one-hundred and twenty electrical degrees for $\theta$. Then:

$$c = T + S(1 - \theta/60)$$
$$d = T + S(1 + \theta/60)$$

and $$\frac{c-d}{c+d} = \frac{[T + S(1 - \theta/60)] - [T + S(1 + \theta/60)]}{[T + S(1 - \theta/60)] + [T + S(1 + \theta/60)]}$$

$$= -\frac{2S\theta/60}{2T + 2S}$$

and $$\frac{c-d}{c+d} = -\frac{S}{60(T+S)}\theta \qquad (4C)$$

Now let:

$$-\frac{S}{60(T+S)}\theta = -\frac{0.0184K}{K^2+0.17}\theta \qquad (4D)$$

as will be done hereinafter in the derivation of an equation by means of which the values of the constants T and S can be determined for the particular situation. Then from Equations 4C and 4D:

$$\frac{c-d}{c+d} = -\frac{0.0184K}{K^2+0.17}\theta \qquad (4E)$$

Since $b=F_0$, as noted in column 23, line 74 to column 24, line 24 and in view of Equation 4E, bridge balance Equation 4B can be written:

$$\frac{a-F_0}{a+F_0} = -\frac{0.0184K}{K^2+0.17}\theta \qquad (4F)$$

Then, if the value of $dF-dP$ for simulated plant 102 were made to equal the value of $a$, as represented by the position of the contact 145, economic balance Equation 4 would be satisfied, and simulated plant 102 would be in economic balance, since substituting the expression $dF/dP$ into bridge balance Equation 4F for its equal, $a$, gives:

$$\frac{dF/dP-F_0}{dF/dP+F_0} = -\frac{0.0184K}{K^2+0.17}\theta$$

which is economic balance Equation 4.

Since it is actually the output value which the simulated plant 102 should have, in order to be in economic balance, which is represented by the positions of the contact 145 and pointer 151, it is not until this simulated plant actually has a value of output corresponding to a balance value represented by the balance position of the contact 145 that the loading value indicated by the pointer 152 is the true economic loading value for actual Plant 1. Thus, as previously noted, the output of simulated plant 102 must be made to follow the position of the contact 145, and hence the position of the pointer 152, so that a true condition of economic balance for simulated plant 102 can be achieved, in which condition the value of output for simulated plant 102 will be equal to the economic value of this output represented by a bridge balance position of the contact 145. The apparatus which causes the output of simulated plant 102 to be effectively adjusted, through the medium of the $F_0$ resistors, so as to follow the values represented by the contact 145 and pointer 152 and to arrive finally at an economic value, will now be described.

ADJUSTMENT OF SIMULATED PLANT OUTPUT

As was noted hereinbefore, simulated plant 102 has been chosen in the present apparatus to operate as a so-called slack plant, whereby the output of this plant is not directly adjusted by the position of the pointer 152. Instead, this output is adjusted or changed indirectly in accordance with this pointer position by having the latter adjust the $F_0$ resistors, of the three portions 101, 201, and 301, and hence the outputs of the other simulated plants 202 and 302. To this end, the aforementioned motor 111 is arranged to adjust the resistors 106, 206, and 306, by means of the linkage 7, as necessary to make the output of simulated plant 102, as indicated by the indicator 105, follow the position of the pointer 152, and finally become equal to an economic and bridge balance output value indicated by the pointer 152.

In this connection, it is noted that the simulated plant output indicator 105 is actuated by a voltage or signal which is representative of this output and which is produced by a watt-meter device 154. The latter is energized from the system analog output terminals 122, 123, 125, and 126, which are connected to the wattmeter input terminals 155 by the conductors 103. Accordingly, the wattmeter 154 is supplied with signals representing the voltage and current of the output of simulated plant 102. From these signals, the wattmeter 154 produces between its output terminals 156 and 157 the voltage or signal which is representative of the value of power or output supplied by the simulated plant 102.

For convenience, it will be considered herein that the magnitude of the wattmeter output signal between the terminals 156 and 157 is proportional to the output of simulated plant 102 expressed in terms of kilowatts or megawatts as appropriate. This signal is applied to the indicator 105 by conductors which connect this indicator between the wattmeter output terminals 156 and 157.

The wattmeter 154 may be of any of the known types which will provide a D.C. output signal proportional to the power measured by the wattmeter. For example, the wattmeter may be a thermal converter arranged to operate at the voltage and current levels present in the particular network analyzer employed as the system analog. Alternately, the wattmeter may be of the dynamometer type, equipped with known means for providing a D.C. signal proportional to the position of the dynamometer pointer.

To obtain the desired adjustment of the $F_0$ resistors by means of the motor 111, the latter is arranged to be responsive to any difference between the load values indicated by the indicator 105 and the position of the pointer 152. For this purpose, the motor 111 is arranged to operate in response to any difference between the wattmeter output signal and a signal proportional to the position of the pointer 152. The last mentioned signal is obtained between the adjustable contact 158 and the left-hand end of a slide wire resistor 159 which is connected between the bridge energizing terminals 129 and 130, and which has its contact 158 positioned by the linkage 151 to be in correspondence with the positions of the pointer 152 and the contact 145.

The motor 111 is arranged to be controlled by a null-detecting and motor driving amplifier 160, which may well be identical to the amplifier 146. The amplifier 160 is responsive to the magnitude and sign of any difference between the magnitudes of the wattmeter output signal and the signal produced by the slide wire 159, and causes the motor 111 to be operative to adjust the $F_0$ resistors as long as any such difference exists. This operation of the motor 111 takes place in the direction and to the extent necessary to so adjust the $F_0$ resistors, the outputs of simulated plants 202 and 302, and hence the output of simulated plant 102, as to bring the two signals controlling the amplifier 160 into equality, and hence reduce said difference between them to zero. In this way, the plant output values indicated by the indicator 105 and the pointer 152 are brought into equality.

The foregoing is achieved in the FIG. 3 apparatus by connecting the wattmeter output terminal 156 to the bridge energizing terminal 129 by a conductor 161, by connecting the other wattmeter output terminal 157 to one input terminal 162 of the amplifier 160 by a conductor 163, and by connecting the remaining amplifier input terminal 164 to the contact 158 of the resistor 159. In this way, the difference between the wattmeter and resistor 159 signals is applied to the input of the amplifier 160 for the control of the motor 111. The latter is connected to the output terminals 165 of the amplifier 160 in the usual manner.

By virtue of the foregoing, the motor 111 adjusts the $F_0$ resistors, and hence the outputs of the simulated plants, as necessary to cause simulated plant 102 to feed into the simulated system 3 the amount of power called for by the position of the pointer 152.

In order to cause the plant loading values specified or assigned by the positions of the pointer 152 and the resistor contacts 145 and 158 to remain between the maximum and minimum rated values for the actual Plant 1, the slide wire resistor 137 or 159 may advantageously be provided with limit switches, not shown, which will deenergize the motor 147, for further operation in the corresponding direction, at positions of the contacts 145 and 158 corresponding to such maximum and minimum rated values.

Under conditions making it desirable to do so, the amplifier 160 and motor 111 could be dispensed with, and the gang-operated $F_0$ resistor contacts manually adjusted as necessary to reduce to zero the reading of a voltmeter connected between the wattmeter output terminal 157 and the resistor contact 158 in lieu of the input of the amplifier 160. However, it is believed that the automatic adjustment of the $F_0$ resistors effected by the disclosed apparatus will be preferable in most instances.

THE PHASE ANGLE ARRANGEMENT 143

The final part of the portion 101 to be described is the aforementioned arrangement 143 which positions the contact 136 of the slide wire 134 in accordance with the existing value of the phase angle $\theta_{1-0}$ for simulated plant 102. As shown in FIG. 3, this arrangement includes a phase angle measuring or determining device 166, and a servo arrangement including a follow-up circuit 167, an amplifier 168, and a follow-up motor 169. The amplifier 168 may be identical to the amplifiers 146 and 160 previously described, while the motor 169 may be identical to the previously described motors 147 and 111.

The phase measuring device is of the well known type which produces a D.C. output signal of a magnitude and polarity which are respectively dependent upon the value and sign of the phase angle between two A.C. signals or voltages applied to the two inputs of the device. In FIG. 3, the voltages from the system analog 3 having the phase angles $\theta_1$ and $\theta_0$, respectively, are applied to the inputs of the device 166, whereby the output signal of the latter has a magnitude and polarity which are respectively dependent upon the magnitude in electrical degrees and the sign of the phase angle $\theta_{1-0}$ by which the simulated plant 102 bus voltage leads the reference voltage. This output of the device 166 is converted by the servo elements 167, 168, and 169 into a proportional position which is transmitted by the linkage 142 to the phase angle resistor contact 136, whereby this contact is accurately positioned in accordance with the value and sign of $\theta_{1-0}$.

Specifically, the simulated reference point voltage of phase angle $\theta_0$ from the output terminals 127 and 128 of the system analog 3 is applied by means of the pair of conductors 104 to the input terminals 170 of one of the two inputs of the device 166. Further, the bus voltage of simulated plant 102, of phase angle $\theta_1$, from the system analog output terminals 122 and 123 is applied to the input terminals 171 of the other of the inputs of the device 166. The D.C. output signal from the output terminals 172 of the device 166 is connected in series with an adjustable D.C. output from the follow-up circuit 167 to the input terminals 173 and 174 of the amplifier 168. This latter is accomplished by means of a conductor which connects one of the output terminals 172 to the input terminal 173, a conductor which connects the other of the output terminals 172 to one of the output terminals 175 of the circuit 167, and a conductor which connects the other output terminal or slide wire contact 176 of the circuit 167 to the other input terminal 174.

The output terminals 177 of the amplifier 168 are connected to the motor 169, which in turn is arranged to adjust the output of the circuit 167 by positioning its contact 176 through the linkage 142. The motor 169 positions the servo contact 176 in the manner necessary to maintain zero input to the amplifier 168, which results in the positioning of this contact in accordance with the value and sign of the $\theta_{1-0}$. Accordingly, the phase angle resistor contact 136 is likewise positioned by the motor 169 and the linkage 142 in accordance with the value and sign of $\theta_{1-0}$.

The phase measuring device 166 may be of any of the well known forms of this type of device which are available on the market. Since the construction and operation of such devices is well known, no further reference to the device 166 is seen to be necessary herein.

The servo arrangement including the elements 167, 168, and 169 may also be of any of the well known forms of such apparatus which are available on the market, and may well be of the type disclosed in the aforementioned Wills Patent No. 2,423,540. Since the manner in which such servo arrangements are constructed and are operative to position a contact, such as the contact 176, in accordance with the magnitude and polarity of a D.C. signal, such as the output of the device 166, is well known, no further description of the present servo arrangement is seen to be necessary herein.

It is noted that the phase angle determining means 143 need not be of the specific form illustrated by way of example in FIG. 3, but instead may be of any suitable desired form which will effect the positioning of the phase angle resistor contact 136 in the specified manner. The specific form chosen for this means for any given situation will depend upon the conditions particular to that situation.

THE PORTION 201

The portion 201 includes duplicates of all of the components and connections included in the portion 101 as just described, these items in the portion 201 bearing reference characters which are the same as those applied to the corresponding items in the portion 101 except for being in the two-hundreds series. The construction and operation of the portion 201 are identical, with respect to corresponding simulated plant 202, to the construction and operation of the portion 101 with respect to corresponding simulated plant 102, except as to the manner in which the output of simulated plant 202 is made to follow the positions of the resistor contacts 245 and 258 and the pointer 252. In the portion 201, the output of simulated plant 202, as shown by the indicator 205, is maintained equal to the load represented by the position of the pointer 252 by arranging the motor 211 to adjust the phase shifter 212 of the simulated plant 202 by means of the linkage 210. Such adjustment of the phase shifter 212 has the effect of changing the value of the output of simulated plant 202, or the value of the load on this plant. Thus, the motor 211 operates or adjusts the phase shifter 212 to cause simulated plant 202 to feed into the simulated system 3 the amount of power called for by the position of the pointer 252.

As a result of the foregoing, the bridge balance position of the pointer 252 represents the most economic loading for simulated plant 202 and corresponding actual Plant 2, since this simulated plant is controlled directly to assume the economic loading value displayed at any time by the pointer 252.

OPERATION OF THE FIG. 3 APPARATUS

Since the function and operation of the various portions and components of the FIG. 3 apparatus have been described hereinbefore in connection with the description of the construction and arrangement of these portions and components, and in connection with the FIG. 1 showing of the complete apparatus, it will be sufficient at this point to present a general, over-all description of the operation of the FIG. 3 apparatus. To this end, it is noted first that, in the practical utilization of this apparatus, the K resistors 133, 135, etc. must be properly adjusted initially in accordance with the actual, numerical values of the corresponding constant K ratios. For example, the knob 141 must be initially manually positioned as necessary to make the effective resistances of the resistors 133 and 135 equal to a particular resistance value which is individual to, or corresponds to, the particular numerical value of $K_{1-0}$. This value, as previously explained, is the value of the constant ratio of the reactance to the resistance of the transfer impedance or equivalent path between actual Plant 1 and the actual common reference point O, and hence is the value of this ratio for the transfer impedance between simulated plant 102 and the simulated reference point O in the system analog 3.

The proper resistance value T for each of the K resistors, corresponding to the existing value of K, can be determined mathematically for any given arrangement by developing a suitable equation relating T and K. The following is the derivation of such an equation, from which the value of T for any of the K resistors can be readily determined for any given value of the corresponding K.

If the resistance of one half of the entire corresponding one of the phase angle slide wire resistors 134 etc. is designated as S, and if it is assumed that the span of the adjustment of the contact along the entire length of this resistor covers sixty electrical degrees on each side of the zero center position, the balance equation for the corresponding bridge circuit can be written as:

$$\frac{dF_n/dP_n - F_0}{dF_n/dP_n + F_0}$$

$$= \frac{[T+S(1-\theta/60)]-[T+S(1+\theta/60)]}{2T+2S} = -\frac{S\theta}{60(T+S)} \quad (5)$$

Substituting Equation 5 into the economic balance Equation 4 gives:

$$\frac{S\theta}{60(T+S)} = \frac{0.0184K}{K^2+0.17}\theta$$

$$SK^2 - 1.104SK + 0.17S = 1.104KT$$

$$\frac{T}{S} = \frac{K^2 - 1.104K + 0.17}{1.104K} \quad (6)$$

With any convenient design value chosen for and assigned to S, Equation 6 provides the proper resistance value setting T for each of resistors 133, 135, etc. as a function of the value of the corresponding ratio K.

Another initial adjustment to be made to the FIG. 3 apparatus is the proper setting of the reference generating cost resistors 106 etc. with respect to the linkage 7. All of these resistors are initially set, relative to the linkage 7, to have equal effective resistances, the value of this common resistance being representative of the value of the arbitrary cost $F_0$ assigned to power at the reference point O. This establishes the original basis on which all plants, both actual and simulated, are economically compared to a common point, and hence are economically compared to each other.

As was explained previously herein, compensation for changes in fuel cost and actual plant operating efficiency from original design values can be effected by the proper adjustment of the corresponding $F_0$ resistor contact relative to the linkage 7 and the other $F_0$ resistor contacts. Thus, the $F_0$ resistor for each plant is desirably utilized as a means for taking into account the effects of changes which affect the established relationship between the effective resistance of the corresponding one of the incremental generating cost resistors 137 etc. and the output of the corresponding plant.

In accordance with the foregoing, the setting or effective resistance value of the resistor 106 is desirably changed in practice, relative to the linkage 7, as necessary to take into account any changes in the cost of fuel at actual Plant 1, and to allow for changes in condenser back pressure, boiler slagging, condition of fuel, turbine clearances, and any other factors which affect the efficiency of Plant 1. Similarly, the relative effective value of the resistor 206 is desirably changed in the above manner to compensate for any of the above changes which affect actual Plant 2. It is desirable to provide such a separate adjustment for the $F_0$ resistor for each plant, since conditions affecting one plant do not necessarily affect the other plants in the same manner or at all, and hence do not necessarily require the same corrective setting to be made to all of the $F_0$ resistors.

When, and as long as, all of the simulated plants have the output values necessary to cause these plants to operate in economic balance and with equal incremental costs of delivered energy for the existing conditions of load on the simulated system, plant, fuel costs, etc., the economic balance equations remain satisfied, the bridge circuits remain in the balanced condition, all of the balancing and follow-up motors remain stationary, and the simulated plant loads are those which are indicated by the balance positions of the corresponding economic loading pointers 152 etc. Under this condition, the loads exhibited by these pointers are the economic loads for the actual plants for the same actual system load and other conditions as those under which the FIG. 3 apparatus with its simulated system 3 is operating.

Upon the occurrence of a change in the value of some condition within the apparatus, such as the load set onto the simulated system 3, which is such as to cause an unbalance to occur between the incremental transmission losses and the incremental generating costs for the simulated plants, the latter will no longer have equal incremental delivered costs, and will no longer be in economic balance. Thus, a redistribution of the system load among the simulated plants will be needed in order to reestablish such economic balance and equality of incremental delivered energy costs. As a result of the foregoing change, the economic balance equations for the simulated plants are no longer satisfied, and the bridge circuits are caused to become unbalanced.

As a result of the bridge circuit of the portion 201 being unbalanced, there is produced between the bridge output terminals 231 and 232 a deviation-from-balance signal of a magnitude and polarity which are respectively dependent, for the conditions then imposed on the bridge circuit, upon the extent and direction of deviation from economic balance between simulated plant 202 and the simulated reference point O. This unbalance signal causes the motor 247 to adjust the resistor contacts 245 and 258 until the position of the contact 245 is that which rebalances the bridge circuit.

As a result of the concurrent repositioning of the contact 258, the motor 211 is caused simultaneously to adjust the phase shifter 212, and hence the output of simulated plant 202, since this output no longer has a value equal to that represented by the position of the contact 258. As a result of this adjustment of the output of simulated plant 202, the value of the phase angle $\theta_{2-0}$ applied to the bridge circuit of the portion 201 also changes, which changes the effective point of bridge balance for the contact 245 along the resistor 237. These actions are in the direction to cause the bridge to come to a final balance position in which the contacts 245 and 258 are so positioned, and the output of simulated plant 202 is so adjusted, that this plant is in economic balance. When this has been achieved, the values of plant output represented by the position of the contacts 245 and 258 and the reading of the indicator 205 will have been brought into equality, as desired.

In connection with the foregoing and previous descriptions provided herein of the operation of the disclosed apparatus, it has been assumed for convenience of description that the relative operating or adjusting speeds of the bridge rebalancing motors, such as the motor 247, and the simulated plant output adjusting motors, such as the motor 211, are such that the corresponding bridge circuit may become balanced temporarily before the corresponding simulated plant output has changed sufficiently to prevent this or to reach its economic value. Since in practice, however, the bridge rebalancing and plant output adjusting actions actually occur simultaneously, the effective movement of the bridge balance point produced by the changing of the corresponding simulated plant output may prevent the bridge rebalancing contact from establishing actual bridge balance until the plant output reaches its economic value. The relationship between the adjusting speeds of the bridge rebalancing and plant load adjusting motors which will give the most satisfactory operation for any given situation depends upon the conditions individual to that situation.

In any case, unbalance of the bridge circuit of the portion 201 causes the motor 247 to start to adjust the contact 245 toward a position of bridge balance. As soon as the contact 245 starts to move, the concurrent movement of the contact 258 causes the motor 211 to start to change the output of simulated plant 202 and the value of $\theta_{2-0}$ in the bridge circuit. Each of these actions is in the direction to cause the bridge unbalance signal finally to go to zero, and to cause the output of simulated plant 202 to be adjusted to the value which results in such final bridge balance, and in economic balance for the plant.

The foregoing description of the operation of the portion 201 in the presence of departure from economic balance for the simulated plants applies as well to identical portion 301, not shown in FIG. 3. Actually, the portion 301 is operative in the manner just described for the portion 201 at the same time that the latter is so operative.

The concurrent operation of the portion 101, associated with the slack simulated plant 102, is somewhat different upon the occurrence of the aforementioned change which unbalances the bridge circuits of the three computing portions. Specifically, as a result of the bridge circuit of the portion 101 being unbalanced, the motor 147 starts to adjust the contact 145 toward a bridge balance position. As soon as the contact 145 starts to move, the concurrent movement of the contact 158 causes the motor 111 to start to adjust the $F_0$ resistors in all of the computing portions, and hence to change the balance points of all of the bridge circuits and the outputs of all of the simulated plants, and especially of the simulated plant 102 which makes up the required difference between the sum of the outputs of simulated plants 202 and 302, and the sum of the loads and losses in the simulated system. When the last mentioned adjustments and changes have caused the difference voltage between the amplifier input terminals 162 and 164 to be approximately zero, the output of simulated plant 102 will have been changed to the economic value therefor, and all of the simulated plants will be in economic balance and will have equal incremental costs of delivered energy for the new value of load on the simulated system.

THE APPARATUS OF FIG. 4

The apparatus of FIG. 4 illustrates one manner in which the load on the system analog 3 of FIGS. 1 and 3 can be adjusted automatically in accordance with the existing operation of the actual system, if desired. In FIG. 4, the system analog load setting knob 4 and load adjusting linkage 26 are shown as being automatically adjusted through a linkage 27 by a controller 28. The latter is shown adjusting the knob 4 jointly in accordance with the values of two quantities. One of these is the total, existing load on the actual system, and the other is the actual system frequency error biased in terms of load in the usual manner. The value of total system load is supplied to the controller 28 by a system load receiver and totalizer 29, which receives telemetered signals indicative of the various loads in the actual system, and totalizes these load values. The value of biased system frequency error is supplied to the controller 28 by a system frequency error measuring instrument 30 which is equipped with the usual frequency set-point adjusting means 31, and which is supplied with the value of the existing system frequency.

In operation, the controller 28 continuously adjusts the load on the system analog 3 as necessary to keep this load equal to the total load on the actual system as biased by the frequency error. In this manner, the operation of the system analog 3 is caused to duplicate and follow the operation of the actual system. Accordingly, the economic loading values displayed by the portions 101, 201, and 301 are caused to be at all times the economic values for the loads on the actual plants.

The devices 28, 29, and 30 may be of the known types available for performing the functions described above, and require no detailed description or explanation herein.

THE APPARATUS OF FIG. 5

The apparatus of FIG. 5 illustrates another manner in which the load on the system analog 3 of FIGS. 1 and 3 can be adjusted automatically in accordance with the existing operation of the actual system, if desired. In FIG. 5, the controller 28 adjusts the knob 4 in accordance with any area requirement or schedule deviation in the actual system, and as necessary to reduce this area requirement or deviation to zero. The value of existing system area requirement is supplied to the controller 28 by an area requirement instrument 32 which is equipped with the usual desired or scheduled system frequency set-point adjusting means 33, and the usual desired or scheduled interchange set-point adjusting means 34. The instrument 32 is also supplied with the values of the net interchange in the actual system and the value of the existing system frequency. Since the construction and operation of such an area requirement instrument are well known, no further description of the instrument 32 is deemed to be necessary herein.

In operation, the controller 28 adjusts or repositions the knob 4 as long as there is any area requirement present for the actual system. When the loads or outputs of the actual system plants are made to follow, either manually or automatically, the economic values therefor as dictated by the portions 101, 201, and 301, the load set onto the system analog 3 will be adjusted by the controller 28 to have the value required to cause the actual system plants to operate in economic balance, to maintain the desired interchange and frequency schedule in the actual system, and to reduce the system area requirement to zero.

CONCLUSION

It should be readily apparent from the foregoing that the method and apparatus disclosed and described herein provide for the assigning of the loads to the generating plants of a system in accordance with their incremental costs of delivered energy, either on a prescheduled basis or under direct manual or automatic control. By the use of my phase angle method of incremental transmission loss and economic balance determination, laborious calculation of network constants is avoided. By the use of an analog of the system, the need for telemetering phase angle data is eliminated. By the use of my reference point method of economic balance comparison, the economic load computing apparatus is desirably of relatively simple form.

What is claimed is:

1. Apparatus for assigning to a generating plant in a power system the load required to balance the incremental transmission losses and generating costs for the plant with respect to a reference point in the system, comprising means to derive from a simulated plant simulating the operation of said system plant an effect representative of the value of the phase angle between the output voltage of said simulated plant and the voltage at a simulated point simulating said system reference point, and means responsive to said effect to adjust the output of said simulated plant to the balance value at which said phase angle has a value which satisfies the equation $$\frac{dF/dP-F}{dF/dP+F} = \frac{0.0184K}{K^2+0.17}\theta$$

wherein $dF/dP$ is the incremental generating cost for said system plant for the value of output represented by said balance value of the output of said simulated plant, F is an arbitrary reference generating cost for said system reference point, $\theta$ is the value of said phase angle in electrical degrees, and K is the constant ratio of the reactance to the resistance of the transfer impedance between said system plant and said system reference point, and between said simulated plant and said simulated point, said balance value for the output of said simulated plant being representative of said required load for said system plant.

2. Apparatus for assigning to a generating plant in a power system the load required to balance the incremental transmission losses and generating costs for the plant with respect to a reference point in the system, comprising means to derive from a simulated plant simulating the operation of said system plant a first effect representative of the value of the phase angle between the output voltage of said simulated plant and the voltage at a simulated point simulating said system reference point, said simulated point being interconnected with said simulated plant in a manner representative of that in which said system plant and reference point are interconnected, means to derive from said first effect a second effect which is representative of the incremental transmission loss for said simulated plant with respect to said simulated point, and means to adjust the output of said simulated plant to the balance value at which said second effect balances a third effect which is representative of the incremental generating cost for said simulated plant with respect to said simulated point, said balance value of the output of said simulated plant being representative of said required load for said system plant.

3. Apparatus for assigning the loads to the interconnected generating plants of a power system in accordance with the incremental costs of delivered energy for the plants, comprising computing means arranged to compute the economic balance value of output for each of said plants corresponding to economic balance between the incremental transmission losses and the incremental generating costs for that plant with respect to a common reference point in said system, said means including other means arranged to compute an effect which is representative of the incremental transmission loss for each of said plants with respect to said point, and which is a function of a phase angle signal supplied to the last mentioned means from an analog of said system and representative of the phase angle between the bus voltage of the corresponding plant and the voltage at said point, said economic balance output values being the plant loads which cause the latter to operate with equal incremental costs of delivered energy at any given time.

4. Apparatus for assigning the loads to the interconnected generating plants of a power system in accordance with the incremental costs of delivered energy for the plants, comprising a computing portion individual to each of said plants and arranged to compute the economic balance value of output for the associated plant corresponding to economic balance between said associated plant and a common reference point in said system, each of said portions including means arranged to produce an effect which is a function of the phase angle between the bus voltage of said associated plant and the voltage at said point, and which is representative of the incremental transmission loss between said associated plant and said point, said means being arranged also to determine the economic balance value of output for said associated plant at which an effect which is representative of the incremental generating cost for said associated plant relative to said point balances said incremental transmission loss effect therefor, and means constituting an analog of said system and arranged to supply to each of said portions signals representative of the corresponding one of said phase angles for the production of the corresponding one of said incremental transmission loss effects, said economic balance output values being the plant loads for the corresponding plants which cause the latter to operate with equal incremental costs of delivered energy for the same system conditions under which said analog is operating.

5. Apparatus for assigning the loads to the interconnected generating plants of a power system in accordance with the incremental costs of delivered energy for the plants, comprising means constituting an analog of said system operating in accordance with the operation of said system under the same conditions, said analog including devices which simulate the operation of said system plants and which constitute simulated plants in said analog, and including a simulated reference point simulating a common reference point in said system, and a computing portion individual to each of said plants and connected to said analog to receive therefrom signals representative of the phase angle between the voltage at said simulated reference point and the output voltage of the associated one of said simulated plants, each of said portions including means arranged to produce an effect which is a function of the corresponding one of said phase angles and which is representative of the incremental transmission loss between said associated simulated plant and said simulated reference point, each of the last mentioned means also being arranged to determine the economic balance value of output for said associated simulated plant at which an incremental generating cost effect therefor with respect to said simulated reference point balances the corresponding one of said loss effects, and means for providing a measure of each of said economic balance outputs, the latter representing the loads to be assigned to the corresponding system plants to cause the latter to operate with equal incremental costs of delivered energy, and in economic balance with said common system reference point and hence with each other, for the system conditions under which said analog is operating.

6. Apparatus for assigning the loads to the interconnected generating plants of a power system in accordance with the incremental costs of delivered energy for the plants, comprising means constituting an analog of said system including devices which simulate the operation of said system plants and which constitute simulated plants in said analog, the latter also including a simulated reference point simulating a common reference point in said system, and a computing portion individual to each of said system plants and its corresponding simulated plant and arranged to adjust the output of the corresponding one of said simulated plants to the economic balance value therefor at which the incremental generating cost for said corresponding simulated plant with respect to said simulated reference point balances the incremental transmission loss for said corresponding simulated plant with respect to said simulated reference point, each of said portions including means arranged to provide a measure of the corresponding one of said incremental transmission losses which is a function of the phase angle between the output voltage of the corresponding one of said simulated plants and the voltage at said simulated reference point, the economic balance values of said simulated plant outputs representing the economic combination of loadings for said system plants at which the latter will operate with equal incremental costs of delivered energy.

7. Apparatus for assigning the loads to the interconnected generating plants of a power system in accordance with the incremental costs of delivered energy for the plants, comprising means constituting an analog of said system including devices which simulate the operation of said system plants and which constitute simulated plants in said analog, the latter also including a simulated reference point simulating a common reference point in said system, and a computing portion individual to each of said system plants and its corresponding simulated plant, each of said portions including first means arranged to derive from the corresponding one of said simulated plants a first effect which is representative of the value of the phase angle between the output voltage of said corresponding simulated plant and the voltage at said simulated point, second means arranged to compute from said first effect a second effect which is a function of said phase angle and which is representative of the incremental transmission loss for said corresponding simulated plant with respect to said simulated reference point, third means arranged to compute a third effect which is a function of the output of said corresponding simulated plant and which is representative of the incremental generating cost for said corresponding simulated plant with respect to said simulated reference point, and fourth means arranged to adjust the output of said corresponding simulated plant to the economic balance value required to establish equality between said second and third effects, these economic balance values of the outputs of said simulated plants representing the economic combination of loadings for said system plants at which the latter will operate with equal incremental costs of delivered energy.

8. Apparatus as specified in claim 7, wherein said fourth means in each of said portions but one directly adjusts the output of the corresponding one of said simulated plants by directly adjusting the corresponding one of said devices, and wherein said fourth means in said one portion adjusts the output of the corresponding simulated plant by adjusting the outputs of the others of said simulated plants through the medium of the corresponding ones of said portions.

9. Apparatus as specified in claim 7 wherein said second and third means in each of said portions are included in a bridge circuit which is balanced when the corresponding second and third effects are equal, and wherein said fourth means in each of said portions includes motor means responsive to unbalance of said bridge circuit and arranged to adjust the output of the corresponding simulated plant as required to balance said bridge circuit.

10. Apparatus as specified in claim 9, wherein said motor means includes a first motor arranged to adjust a rebalancing element in said bridge circuit as required to balance said bridge circuit, and arranged to adjust simultaneously a second element in accordance with the value of the output of the associated simulated plant corresponding to bridge circuit balance, and wherein said motor means also includes a second motor arranged to adjust the value of the output of said associated simulated plant as required to bring this value into correspondence with the value to which said second element is adjusted by said first motor.

References Cited in the file of this patent

UNITED STATES PATENTS

| | | |
|---|---|---|
| 2,613,237 | Starr | Oct. 7, 1952 |
| 2,692,342 | Nichols | Oct. 19, 1954 |
| 2,836,730 | Early | May 27, 1958 |

OTHER REFERENCES

AIEE Tech. Paper 49—242 (George et al.), September 1949, (24 pages).